US006689919B1

(12) United States Patent
Tsuchida et al.

(10) Patent No.: US 6,689,919 B1
(45) Date of Patent: Feb. 10, 2004

(54) CATALYSTS FOR OXIDATIVE POLYMERIZATION OF FLUOROPHENOL, METHOD OF OXIDATIVE POLYMERIZATION OF FLUOROPHENOL, AND POLY(OXYFLUOROPHENYLENE) DERIVATIVE

(75) Inventors: Eishun Tsuchida, Tokyo (JP); Kenichi Oyaizu, Tokyo (JP); Yosuke Kumaki, Tokyo (JP); Kei Saito, Tokyo (JP)

(73) Assignee: Japan Science and Technology Corporation, Saitama (JP)

( * ) Notice: Subject to any disclaimer, the term of this patent is extended or adjusted under 35 U.S.C. 154(b) by 0 days.

(21) Appl. No.: 09/856,365

(22) PCT Filed: Sep. 22, 2000

(86) PCT No.: PCT/JP00/06522

§ 371 (c)(1),
(2), (4) Date: Sep. 7, 2001

(87) PCT Pub. No.: WO01/21683

PCT Pub. Date: Mar. 29, 2001

(30) Foreign Application Priority Data

Sep. 22, 1999 (JP) ............................................. 11-269577
Aug. 31, 2000 (JP) ........................................ 2000-263849

(51) Int. Cl.[7] ....................... C07C 41/09; C07C 43/205; C07C 43/215
(52) U.S. Cl. ....................... 568/635; 568/636; 568/637
(58) Field of Search ................................ 568/636, 637, 568/212, 218; 528/212, 218; 502/152, 155

(56) References Cited

U.S. PATENT DOCUMENTS 4,316,972 A * 2/1982 Petrak ...................... 525/326.7
4,705,843 A * 11/1987 Stammann et al. ......... 528/212

FOREIGN PATENT DOCUMENTS

JP      40-21986      9/1965
JP      2000248060     * 9/2000

OTHER PUBLICATIONS

Schwindinger et al., Molecular Structure of Dichloro(1,4,7–triazacyclononane)copper(II), a Macrocyclic Triamine Complex with an Unusually Small Formation Constant, Inorganic Chemistry, vol. 19, No.5, pp. 1379–1381, 1980.*
Bruce J. Malcolm et al., Polymer, vol. 10, No. 8, pp. 701–705 (1969).
S. H. Hyun et al., Polymer Bulletin, Vol. 19, No. 6, pp. 527–532 (1988).
Ikeda et al., Peroxidase–catalysed polymerization of fluorine–containing phenols, Journal of Macromolecular Science–Pure and Applied Chemistry, 2000, vol. A37, Issue 9, pp. 983–995.*

* cited by examiner

*Primary Examiner*—Rosalynd Keys
(74) *Attorney, Agent, or Firm*—Wenderoth, Lind & Ponack, L.L.P.

(57) ABSTRACT

The synthesis of fluoropolyarylene ether with a high degree of polymerization is enabled, by using a copper complex catalyst with an oxidation potential in the range of −1V to 2V, for the oxidative polymerization of fluorophenols that contain at least one hydrogen atom as well as a fluorine atom bonded to the carbon atoms constituting the benzene ring.

6 Claims, No Drawings

CATALYSTS FOR OXIDATIVE POLYMERIZATION OF FLUOROPHENOL, METHOD OF OXIDATIVE POLYMERIZATION OF FLUOROPHENOL, AND POLY(OXYFLUOROPHENYLENE) DERIVATIVE

TECHNICAL FIELD

The present invention relates to catalysts for the oxidative polymerization of fluorophenols and a method for the oxidative polymerization of fluorophenols wherein such catalysts are used. More particularly, this invention relates to catalysts for the oxidative polymerization of fluorophenols useful for the synthesis of engineering plastics, such as fluoropolyarylene ether, with excellent heat resistance and flame resistance, as well as small friction factor, and a method for the oxidative polymerization of fluorophenols wherein such catalysts are used.

Further, the present invention relates to poly(oxyfluorophenylene) compounds. More particularly, the present invention relates to soluble poly(oxyfluorophenylene) compounds with excellent heat resistance, membrane-formability and chemical stability.

BACKGROUND ART

Polyarylene ethers are known as engineering plastics having characteristics such as excellent heat resistance, mechanical strength, drug resistance, dimensional stability, electric performance, and workability, and are used in various industrial fields, such as mechanical parts, gas separating membranes, conductive resins, and functional rubbers.

In addition, they are also known as being prepared by the oxidative coupling of for example, 2,6-dimethylphenol, using various copper-amine complex catalyst and oxygen.

More specifically, polyarylene ether, particularly poly(2,6-dimethyl-1,4-arylene)ether is prepared by the oxidative coupling of 2,6-dimethylphenols using a tertiary amine (for example, pyridine, tetramethylene diamine, triethylamine, etc.) and a copper (I) salt (e.g. cuprous chloride) which is capable of forming a complex therewith, as a catalyst. This reaction is a less expensive reaction system, since it uses dissolved oxygen as the oxidizing agent and produces water. However, for phenols (such as 2,6-difluorophenol), which contain an electron withdrawing substituent, due to its high oxidation potential, oxidation by copper complex catalysts is difficult, and reports on polymers obtained by oxidative polymerization are scarce. The only method reported so far on the oxidative polymerization of 2,6-difluorophenol involves the use of oxidase as a catalyst (Ryohei Ikeda, Hozumi Tanaka, Hiroshi Uyama and Shiro Kobayashi, 76th Spring Annual Meeting of Japan Chemical Society) However, the degree of polymerization for the polymer product is extremely low, because enzymatic reactions require the use of water as the solvent, making the method unpractical.

Thus, the objective of the present invention is to provide a novel catalyst useful for the oxidative polymerization of fluorophenols, which does not require the use of water as solvent, and enables the polymerization of fluoropolyarylene ether in high degree, and to provide a novel method of the oxidative polymerization of fluorophenols.

Further, another objective of the present invention is to provide poly(oxyfluorophenylene) compounds which have so far been deemed impossible to synthesize.

DISCLOSURE OF THE INVENTION

In order to overcome the above objectives, the present invention firstly provides, a copper complex catalyst for the oxidative polymerization of fluorophenols that contain at least one hydrogen atom as well as a fluorine atom bonded to the carbon atoms constituting the benzene ring, which has an oxidation potential in the range of –1V to 2V.

Further, the invention of the present application secondly provides the above copper complex catalysts for the oxidative polymerization of fluorophenols, wherein the ligand is at least one compound chosen from aliphatic cyclic amines and alkylene cross-linked compounds thereof. The invention thirdly provides a copper complex catalyst for the oxidative polymerization of fluorophenols, wherein the ligand is at least one compound chosen from alkylenediamines and alkylene cross-linked compounds thereof. Fourthly, the present invention provides the copper complex catalysts for the oxidative polymerization of fluorophenols according to any one of claims 1 to 3, wherein the complex is a mononuclear or a binuclear copper complex.

Further, the invention of the present application fifthly provides a method for the oxidative polymerization of fluorophenols that contain at least one hydrogen atom as well as fluorine atoms bonded to the carbon atoms constituting the benzene ring, wherein the copper complex catalyst according to any one of the above-described first to fourth inventions is used. The present invention sixthly provides a method for the oxidative polymerization of fluorophenols represented by the following formula (II):

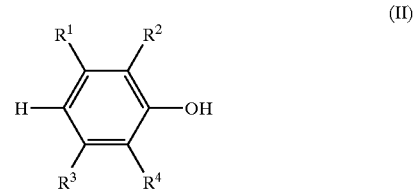

(II)

(wherein $R^1$, $R^2$, $R^3$ and $R^4$ each represents a hydrogen atom, a hydrocarbon group or a fluorine atom, at least one of $R^1$, $R^2$, $R^3$ and $R^4$ being a fluorine atom), according to the aforesaid fifth invention.

The invention or the present application seventhly provides a poly(oxyfluorophenylene) compound represented by the following formula (I):

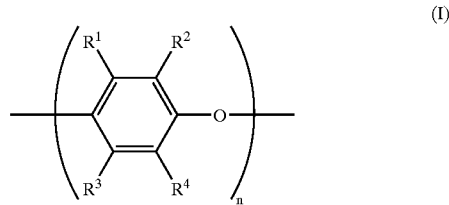

(I)

wherein $R^1$, $R^2$, $R^3$ and $R^4$ each represents a hydrogen atom or a fluorine atom, at least one of which is a fluorine atom, and n is an integer larger than or equal to 2, which represents the degree of polymerization.

Furthermore, the invention of the present application eighthly provides the above-described poly(oxyfluorophenylene) compounds prepared by the oxidative polymerization of the fluorophenol represented by the following formula (II):

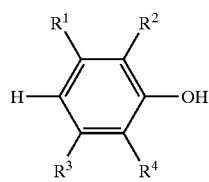

(II)

wherein R¹, R², R³ and R⁴ each represent a hydrogen atom or a fluorine atom, at least one of which is a fluorine atom. The invention of the present application ninthly provides a poly(oxyfluorophenylene) compound obtained by the re-polymerization of the oligomers of the seventh or eighth inventions.

The invention of the present application tenthly provides poly(oxyfluoro-1,4-phenylene-cooxy-1,4-arylene) compounds obtained by the oxidative polymerization of the fluorophenols represented by formula (II) of the eighth invention, with substituted phenols.

Further, the present invention eleventhly provides a method for producing poly(oxyphenylene) compounds, wherein the method for the oxidative polymerization of the eighth invention is performed in the presence of a copper complex catalyst selected from the group consisting of a mononuclear copper complex containing an aliphatic cyclic amine-type multidentate ligand, a mononuclear copper complex containing an alkylenediamine ligand and a binuclear copper complex containing either an aliphatic cyclic amine-type multidentate ligand or a binuclear ligand wherein an alkylenediamine ligand is linked by an alkyl chain.

Furthermore, a method to produce poly(oxyfluoro-1,4-phenylene-cooxy-1,4-arylene) by the oxidative polymerization method according to the ninth invention, in the presence of a catalyst selected from the group consisting of a mononuclear copper complex containing an aliphatic cyclic amine-type multidentate ligand, a mononuclear copper complex containing an alkylenediamine ligand and a binuclear copper complex containing either an aliphatic cyclic amine-type multidentate ligand or a binuclear ligand wherein an alkylenediamine ligand is linked by an alkyl chain is provides as the twelfth invention.

Moreover, as the thirteenth invention, a method for producing poly(oxyphenylene) compounds with substituted phenyl ether as a side chain, which comprises reacting any one of the aforesaid poly(oxyphenylene)compounds with a substituted phenol to replace the fluorine group with a substituted phenyl ether group is provided.

BEST MODE FOR CARRYING OUT THE INVENTION

The present invention has the features described above. Further embodiments of the present invention are discussed below in detail.

The copper complex catalyst used as a catalyst for the oxidative polymerization of fluorophenols of the present invention is composed of a ligand or a group of ligands, and copper (Cu). The ligand in this case should be chosen so that the oxidation potential of the copper complex is in the range of −1V to 2V. It is important that this requirement is fulfilled, and examples of preferable ligands include at least one compound chosen from aliphatic cyclic amines and alkylene cross-linked compounds thereof, as well as at least one compound chosen from alkylenediamines and alkylene cross-linked compounds thereof.

More specifically, preferable examples of the catalysts for the oxidative polymerization of the present invention include compounds selected from mononuclear complexes composed of aliphatic cyclic amine-type multidentate legends, mononuclear complexes composed of alkylenediamine ligands and binuclear complexes with polynuclear ligands wherein such mononuclear complexes are linked via an alkyl chain. Specific examples of such copper complexes are as follows:

<A> 1,4,7-Triazacycloalkane Copper (II) Type Complexes

TABLE 1

(1,4,7-triazacyclononane cupric(II) chloride, (1,4,7-trimethyl-1,4,7-triazacyclononane cupric(II) chloride, (1,4,7-triethyl-1,4,7-triazacyclononane cupric(II) chloride, (1,4,7-tripropyl-(1,4,7-triazacyclononane cupric(II) chloride, (1,4,7-tri-n-butyl-1,4,7-triazacyclononane cupric(II) chloride, (1,4,7-triisopropyl-1,4,7-triazacyclononane cupric(II) chloride, (1,4,7-tri-t-butyl-1,4,7-triazacyclononane cupric(II) chloride, (1,4,7-tricyclohexyl-1,4,7-triazacyclononane cupric(II) chloride, (1,4,7-tribenzyl-1,4,7-triazacyclononane cupric(II) chloride,
(1,4,7-triazacyclononane cupric(II) bromide, (1,4,7-trimethyl-1,4,7-triazacyclononane cupric(II) bromide, (1,4,7-triethyl-1,4,7-triazacyclononane cupric(II) bromide, (1,4,7-tripropyl-1,4,7-triazacyclononane cupric(II) bromide, (1,4,7-tri-n-butyl-1,4,7-triazacyclononane cupric(II) bromide, (1,4,7-triisopropyl-1,4,7-triazacyclononane cupric(II) bromide, (1,4,7-tri-t-butyl-1,4,7-triazacyclononane cupric(II) bromide, (1,4,7-tricyclohexyl-1,4,7-triazacyclononane cupric(II) bromide, (1,4,7-tribenzyl-1,4,7-triazacyclononane cupric(II) bromide,
(1,4,7-triazacyclononane cupric(II) perchlorate, (1,4,7-trimethyl-1,4,7-triazacyclononane cupric(II) perchlorate, (1,4,7-triethyl-1,4,7-triazacyclononane cupric(II) perchlorate, (1,4,7-tripropyl-1,4,7-triazacyclononane cupric(II) perchlorate, (1,4,7-tri-n-butyl-1,4,7-triazacyclononane cupric(II) perchlorate, (1,4,7-triisopropyl-1,4,7-triazacyclononane cupric(II) perchlorate, (1,4,7-tri-t-butyl-1,4,7-triazacyclononane cupric(II) perchlorate, (1,4,7-tricyclohexyl-1,4,7-triazacyclononane cupric(II) perchlorate, (1,4,7-tri-benzyl-1,4,7-triazacyclononane cupric(II) perchlorate,
(1,4,7-triazacyclononane cupric(II) trifluoromethanesulfonate, (1,4,7-trimethyl-1,4,7-triazacyclononane cupric(II)) trifluoro-methanesulfonate, (1,4,7-triethyl-1,4,7-triazacyclononane cupric(II) trifluoromethanesulfonate, (1,4,7-tripropyl-1,4,7-triazacyclononane cupric(II) trifluoromethanesulfonate, (1,4,7-tri-n-butyl-1,4,7-triazacyclononane cupric(II) trifluoromethanesulfonate, (1,4,7-triisopropyl-1,4,7-triazacyclononane cupric(II) trifluoro methanesulfonate, (1,4,7-tri-t-buthyl-1,4,7-triazacyclononane cupric(II) trifluorome-thanesulfonate, (1,4,7-tricyclohexyl-1,4,7-triazacyclononane cupric(II) trifluoromethanesulfonate, (1,4,7-tribenzyl-1,4,7-triaza-cyclononane cupric(II) trifluoromethanesulfonate,

TABLE 2

(1,4,7-triazacyclononane cupric(II) hexafluorophosphate, (1,4,7-trimethyl-1,4,7-triazacyclononane cupric(II) hexafluorophosphate, (1,4,7-triethyl-1,4,7-triazacyclononane cupric(II) hexafluoro-phosphate, (1,4,7-tripropyl-1,4,7-triazacyclononane cupric(II) hexafluorophosphate, (1,4,7-tri-n-butyl-1,4,7-tricyclononane cupric(II) hexafluorophosphate, (1,4,7-triisopropyl-1,4,7-triazacyclononane cupric(II) hexafluorophosophate (1,4,7-tri-t-butyl-1,4,7-triazacyclononane cupric(II) hexafluorophosphate, (1,4,7-tricyclohexyl-1,4,7-triazacyclononane cupric(II) hexafluorophosphate, (1,4,7-tribenzyl-1,4,7-triazacyclononane cupric(II) hexafluorophosphate,
(1,4,7-triazacyclononane cupric(II) tetrafluoroborate, (1,4,7-trimethyl-1,4,7-triazacyclononanecupric(II) tetrafluoroborate, (1,4,7-triethyl-1,4,7-triazacyclononane cupric(II) tetrafluoroborate (1,4,7-tripropyl cupric(II) tetrafluoroborate, (1,4,-tri-n-butyl-1,4,7-triazacyclononane cupric(II) tetrafluoroborate, (1,4,7-triisopropyl-1,4,7-triazacyclononane cupric(II) tetrafluoroborate, (1,4,7-tri-t-butyl-1,4,7-triazacyclononane cupric(II) tetrafluoroborate, (1,4,7-tricyclohexyl-1,4,7-triazacyclononane cupric(II) tetrafluoroborate, (1,4,7-tribenzyl-1,4,7-triazacyclononane cupric(II) tetrafluoroborate, <B> ((bis-(1,4,7-triazacycloalkyl)alkane)-biscupric(II) halide type complexes

TABLE 3

((1,2-bis(1,4,7-triaza-1-cyclononyl)ethane) biscupric(II) chloride, ((1,2-bis(4,7-dimethyl-1,4,7-triaza-1-cyclononyl)ethane) biscupric(II) chloride, ((1,2-bis(4,7-diethyl-1,4,7-triaza-1-cyclononyl)ethane) biscupric(II) chloride, ((1,2-bis(4,7-dipropyl-1,4,7-triaza-1-cyclononyl)ethane) biscupric(II) chloride, ((1,2-bis(4,7-diisopropyl-1,4,7-triaza-1-cyclonyl)ethane) biscupric(II) chloride, ((1,2-bis(4,7-di-n-butyl-1,4,7-triaza-1-cyclonyl)ethane) biscupric(II) chloride, ((1,2-bis(4,7-di-t-butyl-1,4,7-triaza-1-cyclononyl)ethane) biscupric (II) chloride, ((1,2-bis(4,7-dicyclohexyl-1,4,7,triaza-1-cyclononyl)ethane) biscupric(II) chloride, ((1,2-bis(4,7-dibenzyl-1,4,7-triaza-1-cyclononyl) ethane) biscupric(II) chloride,
((1,3-bis(1,4,7-triaza-1-cyclononyl) propane) biscupric(II) chloride, (1,3-bis(4,7-dimethyl-1,4,7-triaza-1-cyclononyl)propane)biscupric (II) chloride, ((1,3-bis(4,7-diethyl-1,4,7-triaza-1-cyclonyl)propane) biscupric(II) chloride, ((1,3-bis(4,7-dipropyl-1,4,7-triaza-1-cyclononyl)propane) biscupric(II) chloride, ((1,3-bis(4,7-diisopropyl-1,4,7-triaza-1-cyclononyl)propane)biscupric(II) chloride, ((1,3-bis-(4,7-di-n-butyl-1,4,7-triaza-1-cyclononyl)propane) biscupric(II) chloride, ((1,3-bis(4,7-di-t-butyl-1,4,7-triaza-1-cyclononyl)propane) biscupric(II) chloride, ((1,3-bis(4,7-dicyclohexyl-1,4,7-triaza-1-cyclononyl)propane) biscupric(II) chloride, ((1,3-bis(4,7-dibenzyl,1,4,7-triaza-1-cyclononyl)propane) biscupric(II) chloride,
((1,4-bis(1,4,7-triaza-1-cyclononyl)-n-butane) biscupric (II) chloride, ((1,4-bis(4,7-dimethyl-1,4,7-triaza-1-cyclononyl)-n-butane) bis-cupric(II) chloride, ((1,4-bis(4,7-diethyl-1,4,7-triaza-1-cyclononyl)-n-butane) biscupric(II) chloride, ((1,4-bis(4,7-dipropyl-1,4,7-triaza-1-cyclononyl)-n-butane) biscupric(II) chloride, ((1,4-bis(4,7-diisopropyl-1,4,7-triaza-1-cyclononyl)-n-butane) biscupric (II) chloride, ((1,4-bis(4,7-di-n-butyl-1,4,7-triaza-1-cyclo-nonyl)-n-butane) biscupric(II) chloride, ((1,4-bis(4,7-di-n-butyl-1,4,7-triaza-1-cyclo-nonyl)-n-butane) bis cupric(II) chloride, ((1,4-bis(4,7-dicyclohexyl-1,4,7-triaza-1-cyclononyl)-n-butane) bis-cupric(II) chloride, ((1,4-bis(4,7-dibenzyl-1,4,7-triaza-1-cyclononyl)-n-butane)biscupric(II)chloride, ((1,5-bis(1,4,7-tria,za-1-cyclononyl)-n-pentane) biscupric(II) chloride, ((1,5-bis(4,7-dimethyl-1,4,7-triaza-1-cyclononyl)-n-pentane) biscupric(II) chloride, ((1,5-bis(4,7-diethyl-1,4,7-triaza-1-cyclononyl)-n-pentane) biscupric(II) Chloride, ((1,5-bis(4,7-dipro-pyl-1,4,7-triaza-1-cyclononyl)-n-pentane) biscupric (II) chloride, ((1,5-bis(4,7-diisopropyl-1,4,7-triaza-1-cyclononyl)-n-pentane) biscupric(II) chloride, ((1,5-bis(4,7-di-n-butyl-1,4,7-triaza-1-cyclo-nonyl)-n-pentane) biscupric(II) chloride, ((1,5-bis(4,7-di-t-butyl-1,4,7-triaza-1-cyclononyl)-n-pentane) bis cupric(II) chloride, ((1,5-bis(4,7-dicyclohexyl-1,4,7-triaza-1-cyclononyl)-n-pentane) biscupric(II) chloride, ((1,5-bis(4,7-dibenzyl-1,4,7-triaza-1-cyclononyl)-n-pentane) biscupric (II) chloride,

TABLE 4

((1,2-bis(1,4,7-triaza-1-cyclononyl)ethane) biscupric(II) bromide, (1,2-bis(4,7-dimethyl-1,4,7-triaza-1-cyclononyl)ethane) biscupric (II)bromide, ((1,2-bis(4,7-diethyl-1,4,7-triaza-1-cyclononyl)ethane)bis cupric(II)bromide, ((1,2-bis(4,7-dipropyl-1,4,7-triaza-1-cyclononyl)ethane) biscupric(II) bromide, ((1,2-bis(4,7-diisopropyl-1,4,7-triaza-1-cyclononyl)ethane) bis cupric(II) bromide, ((1,2-bis(4,7-di-n-butyl-1,4,7-triaza-1-cyckononyl)ethane) bis cupric(II) bromide, ((1,2-bis(4,7-di-t-butyl-1,4,7-triaza-1-cyclononyl)ethane) bis cupric(II)bromide, ((1,2-bis(4,7-dicyclohexyl-1,4,7-triaza-1-cyclononyl)ethane) biscupric(II) bromide, ((1,2-bis(4,7-dibenzyl-1,4,7-triaza-1-cyclononyl)ethane) bis cupric(II)bromide,
((1,3-bis(1,4,7-triaza-1-cyclononyl)propane) biscupric(II) bromide, ((1,3-bis(4,7-dimethyl-1,4,7-triaza-1-cyclononyl)propane) bis cupric(II)bromide, ((1,3-bis (4,7-diethyl-1,4,7-triaza-1-cyclononyl)propane) bis cupric(II)bromide, ((1,3-bis(4,7-dipropyl-1,4,7-triaza-1-cyclononyl)propane) bis cupric(II)bromide, ((1,3-bis(4,7-diisopropyl-1,4,7-triaza-1-cyclononyl)propane)bis-cupric(II)bromide, ((1,3-bis(4,7-di-n-butyl-1,4,7-triaza-1-cyclononyl)propane) bis cupric(II) bromide, ((1,3-bis(4,7-di-t-buty)-1,4,7-triaza-1-cyclononyl)propane) biscupric (II) bromide, ((1,3-bis(4,7-dicyclohexyl-1,4,7-triaza-1-cyclononyl)propane) bis

TABLE 4-continued cupric(II)bromide, ((1,3-bis(4,7-dibenzyl-1,4,7-triaza-1-cyclononyl)propane) bis cupric(II) bromide,
((1,4-bis (1,4,7-triaza-1-cyclononyl)-n-butane) bis cupric(II) bromide, ((1,4-bis(4,7-dimethyl-1,4,7-triaza-1-cyclononyl)-n-butane) bis cupric(II)bromide, ((1,4-bis(4,7-diethyl-1,4,7-triaza-1-cyclononyl)-n-butane) biscupric(II) bromide, ((1,4-bis(4,7-dipropyl-1,4,7-triaza-1-cyclononyl)-n-butane) biscupric(II) bromide, ((1,4-bis (4,7-diiso-propyl-1,4,7-triaza-1-cyclononyl)-n-butane) bis cupric(II) bromide, ((1,4-bis(4,7-di-n-butyl-1,4,7-triaza-1-cyclononyl)-n-butane) bis- cupric(II) bromide, ((1,4-bis(4,7-di-t-butyl-1,4,7-triaza-1-cyclo-nonyl)-n-butane) bis cupric(II) bromide, ((1,4-bis(4,7-dicyclohexyl-1,4,7-triaza-1-cyclononyl)-n-butane) bis cupric(II) bromide, ((1,4-bis(4,7-dibenzy)-1,4,7-triaza-1-cyclononyl)-n-butane) biscupric(II) bromide,
((1,5-bis(4,7-triaza-1-cyclononyl)-n-pentane) biscupric(II) bromide, ((1,5-bis(4,7-dimethyl-1,4,7-triaza-1-cyclononyl)-n-pentane) bis-cupric(II) bromide, ((1,5-bis(4,7-diethyl-1,4,7-triaza-1-cyclononyl)-n-pentane) biscupric(II) bromide, ((1,5-bis(4,7-dipropyl-1,4,7-triaza-1-cyclononyl)-n-pentane) biscupric(II) bromide, ((1,5-bis(4,7-diisopropyl-1,4,7-triaza-1-cyclononyl)-n-pentane) bis cupric(II)bromide, ((1,5-bis(4,7-di-butyl-1,4,7-triaza-1-cyclononyl)-n-pentane) bis cupric(II) bromide, ((1,5-bis(4,7-di-t-butyl-1,4,7-triaza-1-cyclononyl)-n-pentane) biscupric(II) bromide, ((1,5-bis(4,7-dicyclohexyl-1,4,7-triaza-1-cyclononyl)-n-pentane) bis cupric(II)bromide, ((1,5-bis(4,7-dibenzyl-1,4,7-triaza-1-cyclononyl)-n-pentane) bis cupric(II) bromide, <C> ((bis(1,4,7-triazacycloalkyl)alkane)-biscupric(II) perchlorate-type complexes

TABLE 5

((1,2-bis(1,4,7-triaza-1-cyclononyl)ethane) bis cupric(II)perchlorate, ((1,2-bis(4,7-dimethyl-1,4,7-triaza-1-cyclononyl)ethane) bis cupric(II)perchlorate, ((1,2-bis(4,7-diethyl-1,4,7-triaza-1-cyclononyl)ethane) biscupric(II) perchlorate, ((1,2-bis(4,7-dipropyl-1,4,7-triaza-1-cyclononyl)ethane) bis cupric(II)perchlorate, ((1,2-bis(4,7-diisopropyl-1,4,7-triaza-1-cyclononyl)ethane) biscupric(II) perchlorate, ((1,2-bis(4,7-di-n-butyl-1,4,7-triaza-1-cyclononyl)ethane) bis cupric(II) perchlorate, ((1,2-bis(4,7-di-1-butyl-1,4,7-triaza-1-cyclononyl)ethane) biscupric(II) perchlorate, ((1,2-bis(4,7-dicyclo-hexyl-1,4,7-triaza-1-cyclononyl)ethane) biscupric(II) perchlorate, ((1,2-bis(4,7-dibenzyl-1,4,7-triaza-1-cyclononyl) ethane) biscupric (II) perchlorate,
((1,3-bis(1,4,7-triaza-1-cyclononyl)propane) biscupric(II) perchlorate, ((1,3-bis(4,7-dimethyl-1,4,7-triaza-1-cyclononyl)propane)biscupric(II) perchlorate, ((1,3-bis(4,7-diethyl-1,4,7-triaza-1-cyclo-nonyl)propane) biscupric(II) perchlorate, ((1,3-bis(4,7-dipropyl-1,4,7-triaza-1-cyclononyl)propane) bis cupric(II)perchlorate, ((1,3-bis(4,7-diisopropyl-1,4,7-triaza-1-cyclononyl)propane) bis cupric(II)perchlorate, ((1,3-bis(4,7-di-n-butyl-1,4,7-triaza-1-cyclononyl)propane) bis cupric(II)perchlorate, ((1,3-bis(4,7-di-t-butyl-1,4,7-triaza-1-cyclononyl)propane) bis cupric(II)perchlorate, ((1,3-bis(4,7-di-cyclohexyl,1,4,7-triaza-1-cyclononyl)propane) bis-cupric(II)perchlorate, ((1,3-bis(4,7-dibenzyl-1,4,7-triaza-1-cyclononyl)propane) biscupric (II) perchlorate,
((1,4-bis(1,4,7-triaza-1-cyclononyl)-n-butane) bis cupric(II) perchlorate, ((1,4-bis(4,7-dimethyl-1,4,7-triaza-1-cyclononyl)-n-butane) bis cupric(II) perchlorate, ((1,4-bis(4,7-diethyl-1,4,7-triaza-1-cyclononyl)-n-butane) biscupric(II) perchlorate, ((1,4-bis(4,7-dipropyl-1,4,7-triaza-1-cyclononyl)-n-butane) bis cupric(II) perchlorate, ((1,4-bis(4,7-diisopropyl-1,4,7,triaza-1-cyclononyl), n-butane) biscupric(II) perchlorate, ((1,4-bis(4,7-di-n-butyl-1,4,7-triaza-1-cyclononyl)-n-butane) biscupric(II) perchlorate, ((1,4-bis(4,7-di-t-butyl-1,4,7-triaza-1-cyclononyl)-n-butane) bis cupric(II) perchlorate, ((1,4-bis(4,7-dicyclohexyl-1,4,7-triaza-1-cyclononyl)-n-butane) biscupric(II) perchlorate, ((1,4-bis(4,7-dibenzyl-1,4,7-triaza-1-cyclononyl)-n-butane) bis cupric(II) perchlorate,
((1,5-bis(1,4,7-triaza-1-cyclononyl)-n,pentane) biscupric(II) perchlorate, ((1,5-bis(4,7,dimethyl-1,4,7-triaza-1-cyclononyl), n-pentane) biscupric(II) perchlorate, ((1,5-bis(4,7-diethyl-1,4,7-triaza-1-cyclononyl)-n-pentane) biscupric(II) perchlorate, ((1,5-bis (4,7-dipropyl-1,4,7-triaza-1-cyclononyl)-n-pentane) biscupric(II)

TABLE 5-continued perchlorate, ((1,5-bis(4,7-diisopropyl-1,4,7-triaza-1-cyclononyl)-n-pentane) biscupric(II) perchlorate, ((1,5-bis(4,7-di-n-butyl-1,4,7-triaza-1-cyclononyl)-n-pentane) bis cupric(II)perchlorate, ((1,5-bis(4,7-di-t-butyl-1,4,7-triaza-1- cyclononyl)-n-pentane) bis cupric(II)perchlorate, ((1,5-bis(4,7- dicyclohexyl-1,4,7-triaza-1-cyclononyl)-n-pentane) biscupric(II) perchlorate, ((1,5-bis(4,7-dibenzyl-1,4,7-triaza-1-cyclononyl)-n-pentane) bis cupric(II) perchlorate,

<D> ((bis(1,4,7-triazacycloalkyl)alkane)biscupric(II) perchlorate-type complexes

TABLE 6

((1,2-bis(1,4,7-triaza-1-cyclononyl)ethane) biscupric(II) trifluoromethanesulfonate, ((1,2-bis(4,7-dimethyl-1,4,7-triaza-1-cyclononyl) ethane) biscupric (II) trifluoromethanesulfonate, ((1,2-bis(4,7-diethyl-1,4,7-triaza-1-cyclononyl)ethane) biscupric(II) trifluoromethanesulfonate, ((1,2-bis(4,7-dipropyl- 1,4,7-triaza-1-cyclononyl) ethane) biscupric(II) trifluoromethanesulfonate, ((1,2-bis(4,7-diisopropyl-1,4,7-triaza-1-cyclononyl) ethane) bis cupric(II) trifluoromethanesulfonate, ((1,2-bis(4,7-di-n-butyl-1,4,7-triaza-1-cyclononyl)ethane) bis cupric(II) trifluoromethanesulfonate, ((1,2-bis(4,7-di-1-butyl-1,4,7-triaza-1-cyclononyl)ethane) bis cupric(II) trifluoromethanesulfonate, ((1,2-bis(4,7-dicyclohexyl-1,4,7-triaza-1-cyclononyl)ethane) biscupric(II) trifluoromethanesulfonate, (1,2-bis(4,7-dibenzyl-1,4,7-triaza-1-cyclononyl)ethane) bis cupric(II) trifluoromethanesulfonate, ((1,3-bis(1,4,7-triaza-1-cyclononyl)propane) biscupric(II) trifluoromethanesulfonate, ((1,3-bis(4,7-dimethyl-1,4,7-triaza-1-cyclononyl)propane) bis cupric(II) trifluoromethanesulfonate, ((1,3-bis(4,7-diethyl-1,4,7-triaza-1-cyclononyl)propane) bis cupric(II) trifluoromethanesulfonate, ((1,3-bis(4,7-dipropyl-1,4,7-triaza-1-cyclononyl) propane) biscupric(II) trifluoromethanesulfonate, ((1,3-bis(4,7-diisopropyl-1,4,7-triaza-1-cyclononyl)propane) bis cupric(II) trifluoromethanesulfonate, ((1,3-bis(4,7-di-n-butyl-1,4,7-triaza-1-cyclo-nonyl)propane) bis cupric(II) trifluoromethanesulfonate, (1,3-bis(4,7-di-1-butyl-1,4,7-triaza-1-cyclononyl)propane) bis cupric (II) trifluoromethanesulfonate, ((1,3-bis(4,7-dicyclohexyl-1,4,7-triaza-1-cyclononyl)propane) bis cupric(II) trifluoromethanesulfonate, ((1,3-bis(4,7-dibenzyl-1,4,7-triaza-1-cyclononyl)propane) bis cupric(II) trifluoromethanesulfonate, (1,4-bis(1,4,7-triaza-1-cyclononyl)-n-butane) bis cupric(II) trifluoromethanesulfonate, ((1,4-bis(4,7-dimethyl-1,4,7-triaza-1-cyclononyl)-n-butane) biscupric (II) trifluoromethanesulfonate, ((1,4-bis(4,7-diethyl-1,4,7-triaza-1-cyclononyl)-n-butane) bis cupric(II) trifluoromethanesulfonate, ((1,4-bis(4,7-dipropyl-1,4,7-triaza-1-cyclononyl)-n-butane) biscupric(II) trifluoromethanesulfonate, ((1,4-bis(4,7-diisopropyl-1,4,7-triaza-1-cyclononyl)-n-butane) biscupric(II) trifluoromethanesulfonate, ((1,4-bis(4,7-di-n-butyl-1,4,7-triaza-1-cyclononyl)-n-butane) biscupric(II) trifluoromethanesulfonate, ((1,4-bis(4,7-di-1-butyl-1,4,7-triaza-1-cyclononyl)-n-butane) bis cupric(II) trifluoromethanesulfonate, ((1,4-bis(4,7-dicyclohexyl-1,4,7-triaza-1-cyclononyl)-n-butane) biscupric(II) trifluoromethanesulfonate, ((1,4-bis(4,7-dibenzyl-1,4,7-triaza-1-cyclononyl)-n-butane) bis cupric(II)trifluoromethanesulfonate, ((1,5-bis(1,4,7-triaza-1-cyclononyl)-n-pentane) bis cupric(II) trifluoromethanesulfonate, ((1,5-bis(4,7-dimethyl-1,4,7-triaza-1-cyclo-nonyl)-n-pentane) bis cupric(II) trifluoromethanesulfonate, ((1,5-bis-(4,7-diethyl-1,4,7-triaza-1-cyclononyl)-n-pentane) bis cupric(II) trifluoromethanesulfonate, ((1,5-bis(4,7-dipropyl-1,4,7-triaza-1-cyclo-nonyl)-n-pentane) bis cupric(II) trifluoromethanesulfonate, ((1,5-bis(4,7-diisopropyl-1,4,7-triaza-1-cyclononyl)-n-pentane) biscupric (II) trifluoromethanesulfonate, ((1,5-bis(4,7-di-n-butyl-1,4,7-triaza-1-cyclononyl)-n-pentane) bis cupric(II) trifluoromethanesulfonate, ((1,5-bis(4,7-di-t-butyl-1,4,7-triaza-1-cyclononyl)-n-pentane) bis cupric(II) trifluoromethanesulfonate, ((1,5-bis(4,7-dicyclohexyl-1,4,7-triaza-1-cyclononyl)-n-pentane) bis cupric(II) trifluoromethanesulfonate, ((1,5-bis(4,7-dibenzyl-1,4,7-triaza-1-cyclononyl)-n-pentane) bis cupric(II) trifluoromethanesulfonate,

<E> ((bis(1,4,7-triazacycloalkyl)alkane)biscupric(II) hexafluorophosphate-type complexes

TABLE 7

((1,2-bis(1,4,7-triaza-1-cyclononyl)ethane) bis cupric(II) hexafluorophosphate, ((1,2-bis(4,7-dimethyl-1,4,7-triaza-1-cyclononyl)ethane) bis cupric(II) hexafluorophosphate, ((1,2-bis(4,7-diethyl-1,4,7-triaza-1-cyclononyl)ethane) bis cupric(II) hexafluorophosphate, ((1,2-bis(4,7-dipropyl-1,4,7-triaza-1-cyclononyl)ethane) bis cupric(II) hexafluorophosphate, ((1,2-bis(4,7-diisopropyl-1,4,7-triaza-1-cyclononyl)ethane) biscupric(II) hexafluorophosphate, ((1,2-bis(4,7-di-n-butyl-1,4,7-triaza-1-cyclononyl)ethane) biscupric(II)hexafluorophosphate, ((1,2-bis(4,7-di-t-buthyl-1,4,7-triaza-1-cyclononyl)ethane) bis cupric(II) hexafluorophosphate, ((1,2-bis(4,7-dicyclohexyl-1,4,7-triaza-1-cyclononyl)ethane) bis cupric(II) hexafluorophosphate, ((1,2-bis(4,7-dibenzyl-1,4,7-triaza-1-cyclononyl)ethane) bis cupric(II) hexafluorophosphate, ((1,3-bis (1,4,7-triazacyclononyl)propane) bis cupric(II) hexafluorophosphate, ((1,3-bis(4,7-dimethyl-1,4,7-triaza-1-cyclononyl)propane) bis cupric(II) hexafluorophosphate, ((1,3-bis(4,7-diethyl-1,4,7-triaza-1-cyclononyl)propane) biscupric(II) hexafluorophosphate, ((1,3-bis(4,7-dipropyl-1,4,7-triaza-1-cyclononyl)propane) bis cupric(II) hexafluorophosphate, ((1,3-bis(4,7-diisopropyl-1,4,7-triaza-1-cyclononyl)propane) bis cupric(II)hexafluorophosphate, ((1,3-bis(4,7-di-n-butyl-1,4,7-triaza-1-cyclononyl)propane) bis cupric(II) hexafluorophosphate, ((1,3-bis(4,7-dicyclohexyl-1,4,7-triaza-1-cyclononyl)propane) bis cupric(II)hexafluorophosphate, ((1,3-bis(4,7-dibenzyl-1,4,7-triaza-cyclononyl)propane) biscupric(II) hexafluorophosphate, ((1,4-bis(1,4,7-triaza-1-cyclononyl)-n-butane) bis cupric(II) hexafluorophosphate, ((1,4-bis(4,7,dimethyl-1,4,7-triaza-1-cyclononyl)-n-butane)biscupric(II)hexafluorophosphate, ((1,4-bis(4,7-diethyl-1,4,7-triaza-1-cyclononyl)-n-butane) biscupric(II) hexafluorophosphate, ((1,4-bis(4,7,dipropyl-1,4,7-triazacyclononyl)-n-butane) biscupric(II) hexafluorophosphate, ((1,4-bis(4,7-diisopropyl-1,4,7-triaza-1-cyclononyl)-n-butane) bis cupric(II) hexafluorophosphate, ((1,4-bis(4,7-di-n-butyl-1,4,7-triaza-1-cyclononyl)-n-butane) bis cupric(II) hexafluorophosphate, ((1,4-bis(4,7-di-t-butyl-1,4,7-triaza-1-cyclononyl)-n-butane) biscupric(II) hexafluorophosphate, ((1,4-bis(4,7-dicyclohexyl-1,4,7-triaza-1-cyclononyl)-n-butane) biscupric (II) hexafluorophosphate, ((1,4-bis(4,7-dibenzyl-1,4,7-triaza-1-cyclononyl)-n-butane) bis cupric(II)hexafluorophosphate, ((1,5-bis(1,4,7-triaza-1-cyclononyl)-n-pentane) bis cupric(II) hexafluorophosphate, ((1,5-bis(4,7-dimethyl-1,4,7-triaza-1-cyclononyl)-n-pentane) biscupric(II)hexafluorophosphate, ((1,5-bis(4,7-diethyl-1,4,7-triaza-1-cyclononyl)-n-pentane) biscupric(II) hexafluorophosphate, ((1,5-bis(4,7-dipropyl-1,4,7-triaza-1-cyclononyl)-n-pentane) biscupric(II)hexafluorophosphate, ((1,5-bis(4,7-diisopropyl-1,4,7-triaza-1-cyclononyl)-n-pentane) biscupric(II) hexafluorophosphate, ((1,5-bis(4,7-di-n-butyl-1,4,7-triaza-1-cyclononyl)-n-pentane) biscupric(II) hexafluorophosphate, ((1,5-bis(4,7-di-t-butyl-1,4,7-triaza-1-cyclononyl)-n-pentane) bis cupric(II) hexafluorophosphate, ((1,5-bis(4,7-dicyclonhexyl-1,4,7-triaza-1-cyclononyl)-n-pentane) biscupric (II) hexafluorophosphate, ((1,5-bis(4,7-dibenzyl1,4,7-triaza-1-cyclononyl)-n-pentane) bis cupric(II) hexafluorophosphate,

<F> ((bis(1,4,7-triazacycloalkyl)alkane)biscupric(II) tetrafluoroborate-type complexes

TABLE 8

((1,2-bis(1,4,7-triaza-1-cyclononyl)ethane) biscupric(II) tetrafluoroborate, ((1,2-bis(4,7-dimethyl-1,4,7-triaza-1-cyclononyl)ethane) bis cupric(II) tetrafluoroborate, ((1,2-bis(4,7-diethyl-1,4,7-triaza-1-cyclononyl)ethane) bis cupric(II) tetrafluoroborate, ((1,2-bis(4,7-dipropyl-1,4,7-triaza-1-cyclononyl)ethane)biscupric(II)tetrafluoroborate, ((1,2-bis (4,7-diisopropyl-1,4,7-triaza-1-cyclononyl)ethane)bis cupric(II) tetrafluoroborate, ((1,2-bis(4,7-di-n-butyl-1,4,7-triaza-1-cyclononyl)ethane) bis cupric(II)tetrafluoroborate, ((1,2-bis(4,7-di-t-butyl-1,4,7-triaza-1-cyclononyl)ethane) bis cupric(II) tetrafluoroborate, ((1,2-bis(4,7-dicyclohexyl-1,4,7-triaza-1-cyclononyl)ethane) bis cupric(II) tetrafluoroborate, ((1,2-bis(4,7-dibenzyl-1,4,7-triaza-1-cyclononyl)ethane)bis cupric(II) tetrafluoroborate,

TABLE 8-continued ((1,3-bis(1,4,7-triaza-1-cyclononyl)propane) bis cupric(II) tetrafluoroborate, ((1,3-bis(4,7-diisopropyl-1,4,7-triaza-cyclononyl)propane) bis cupric(II) tetrafluoroborate, ((1,3-1-bis(4,7-di-n-butyl-1,4,7-triaza-1-cyclononyl)propane) bis cupric(II) tetrafluoroborate, ((1,3-bi,(4,7-di-t-butyl-1,4,7-triaza-1-cyclononyl)propane) biscupric(II) tetrafluoroborate, ((1,3-bis(4,7-dicyclohexyl-1,4,7-triaza-1-cyclononyl)- propane) biscupric(II) tetrafluoroborate, ((1,3-bis (4,7-dibenzyl-1,4,7-triaza-1-cyclononyl)propane) biscupric(II) tetrafluoroborate, ((1,4-bis(1,4,7-triaza-1-cyclononyl)-n-butane) bis cupric(II) tetrafluoroborate, ((1,4-bis(4,7-dimethyl-1,4,7-triaza-1-cyclononyl)-n-butane) bis cupric(II) tetrafluoroborate, ((1,4-bis(4,7-diethyl-1,4,7-triaza-1-cyclononyl)-n-butane) biscupric(II) tetrafluoroborate, ((1,4-bis(4,7-dipropyl-1,4,7-triaza-1-cyclononyl)-n-butane) biscupric(II) tetrafluoroborate, ((1,4-bis(4,7-di-n-butyl-1,4,7-triaza-1-cyclononyl)-n-butane) bis cupric(II) tetrafluoroborate, ((1,4bis(4,7-di-t-butyl-1,4,7-triaza-1-cyclononyl)-n-butane) bis cupric(II) tetrafluoroborate, ((1,4-bis(4,7-dicyclohexyl-1,4,7-triaza-1-cyclononyl)-n-butane) bis cupric(II) tetrafluoroborate, ((1,4-bis (4,7-dibenzyl-1,4,7-triaza-1-cyclononyl)-n-butane) biscupric(II) tetrafluoroborate, ((1,5-bis(1,4,7-triaza-cyclononyl)-n-pentane) bis cupric(II) tetrafluoroborate, ((1,5-bis(4,7-dimethyl-1,4,7-triaza-1-cyclononyl)-n-pentane) biscupric(II) tetrafluoroborate, ((1,5-bis(4,7-diethyl-1,4,7-triaza-1-cyclononyl)-n-pentane) biscupric(II) tetrafluoroborate, ((1,5-bis(4,7-dipropyl-1,4,7-triaza-1-cyclononyl)-n-pentane) bis cupric(II) tetrafluoroborate, ((1,5-bis(4,7-diisopropyl-1,4,7-triaza-1-cyclononyl)-n-pentane) bis cupric(II)tetrafluoroborate, ((1,5-bis(4,7-di-n-butyl-1,4,7-triaza-1-cyclononyl)-n-pentane) bis cupric(II) tetrafluoroborate, ((1,5-bis(4,7-di-t-butyl-1,4,7-triaza-1-cyclononyl)-n-pentane) bis cupric(II)tetrafluoroborate, ((1,5-bis(4,7-dicyclohexyl-1,4,7-triaza-1-cyclononyl)-n-pentane) biscupric(II) tetrafluoroborate, ((1,5-bis(4,7-dibenzyl-1,4,7-triazacyclononyl)-n-pentane) bis cupric (II) tetrafluoroborate, <G> ethylenediamine cupric(II)-type complexes

TABLE 9

(ethylenediamine cupric(II) chloride, (N,N'-dimethylethylenediamine cupric(II) chloride, (N,N'-diethylethylenediamine cupric(II) chloride, (N,N'-dipropylethylenediamine cupric(II) chloride, (N,N'-diisopropylethylenediamine cupric(II) chloride, (N,N'-di-n-butyl-ethylenediamine cupric(II) chloride, (N,N'-di-t-butylethylenediamine cupric(II) chloride, (N,N,N',N'-tetramethylethylenediamine cupric(II) chloride, (N,N,N',N'-tetramethylethylenediamine cupric (II) chloride, (N,N,N',N'-tetrapropylethylenediamine cupric(II) chloride, (N,M,N',N'-tetraisopropylethylenediamine cupric(II) chloride, (N,N,N',N'-tetra-n-butylethylenediamine cupric(II) chloride, (N,N1N',N'-tetra-t-butylethylenediamine cupric(II) chloride, (ethylenediamine cupric (II) bromide, (N,N'-dimethylethylenediamine cupric(II) bromide, (N,N', -diethylethylenediamine cupric (II) bromide, (N,N'-dipropylethylenediamine cupric(II) bromide, (N,N'-diisopropylethylenediamine cupric(II) bromide, (N,N'-di-n butylethylenediamine cupric(II) bromide, (N,N'-di-t-butyl-ethylenediamine cupric(II) bromide, (N,N,N',N'-tetramethylethylenediamine cupric(II) bromide, (N,N,N',N'-tetraethylethylenediamine cupric(II) bromide, (N,N,N',N'-tetrapropylethylenediamine cupric(II) bromide, (N,N,N',N'-tetraisopropylethylenediamine cupric (II) bromide, (N,N,N',N'-tetra-n-butylethylenediamine cupric(II) bromide, (N,N,N',N'-tetra-t-butylethylenediamine cupric(II) bromide, (ethylenediamine cupric(II) perchlorate, (N,N'-dimethylethylenediamine cupric(II) perchlorate, (N,N'-diethylethylenediamine cupric (II) perchlorate, (N,N'-dipropylethylenediamine cupric(II) perchlorate, (N,N'-diisopropylethylenediamine cupric(II) perchlorate, (N,N'-di-n-butylethylenediamine cupric(II) perchlorate, (N,N'-di-t-butylethylenediamine cupric(II) perchlorate, (N,N,N',N'-tetra-methylethylenediamine cupric(II) perchlorate, (N,N,N',N'-tetra-ethylethylenediamine cupric(II) perchlorate, (N,N,N',N'-tetra-propylethylenediamine cupric(II) perchlorate, (N,N,N',N'-tetra-isopropylenediamine cupric(II) perchlorate, (N,N,N',N'-tetra-n-butylethylenediamine cupric(II) perchlorate, (N,N,N',N'-tetra-t-butylethylenediamine cupric(II) perchlorate,

TABLE 10

(ethylenediamine cupric(II) trifluoromethanesulfonate, (N,N'-dimethylethylenediamine cupric(II) trifluoromethanesulfonate, (N,N'-diethylethylenediamine cupric(II) trifluoromethanesulfonate, (N,N'-dipropylethylenediamine cupric(II) trifluoromethanesulfonate, (N,N'-diisopropylethylenediamine cupric(II) trifluoromethanesulfonate, (N,N'-di-n-butylethylenediamine cupric(II) trifluoromethanesulfonate, (N,N', -di-t-butylethylenediamine cupric(II) trifluoromethanesulfonate, (N,N,N',N'-tetramethylethylenediamine cupric(II) trifluoromethanesulfonate, (N,N,N',N'-tetraethylethylenediamine cupric(II) trifluoromethanesulfonate, (N,N,N',N'-tetrapropylethylenediamine cupric(II) trifluoromethanesulfonate, (N,N,N',N'-tetraisopropylethylenediamine cupric(II) trifluoromethanesulfonate, (N,N,N',N'-tetra-n-butylethylenediamine cupric(II) trifluoromethanesulfonate, (N,N,N',N'-tetra-t-butylethylenediamine cupric (II) trifluoromethanesulfonate, (ethylenediamine cupric(II) hexafluorosulfonate, (N,N'-dimethyl-ethylenediamine cupric(II) hexafluorosulfonate, (N,N'-diethyl-ethylenediamine cupric(II) hexafluorosulfonate, (N,N'-dipropyl-ethylenediamine cupric(II) hexafluorosulfonate, (N,N'-diisopropyl-ethylenediamine cupric(II) hexafluorosulfonate, (N,N'-di-n-butyl-ethylenediamine cupric(II) hexafluorosulfonate, (N,N'-di-t-butyl-ethylenediamine cupric(II) hexafluorosulfonate, (N,N,N',N'-tetra-methylethylenediamine cupric(II) hexafluorosulfonate, (N,N,N',N'-tetraethylethylenediamine cupric(II) hexafluorosulfonate, (N,N,N',N'-tetrapropylethylenediamine cupric(II) hexafluorosulfonate, (N,N,N',N'-tetraisopropylethylenediamine cupric(II) hexafluorosulfonate, (N,N,N',N'-tetra-n-butylethylenediamine cupric(II) hexafluorosulfonate, (N,N,N',N'-tetra-1-butylethylenediamine cupric (II) hexafluorosulfonate, (ethylenediamine cupric(II) tetrafluoroborate, (N,N'-dimethyl-ethylenediamine cupric(II) tetrafluoroborate, (N,N'-diethyl-ethylenediamine cupric(II) tetrafluoroborate, (N,N'-dipropyl-ethylenediamine cupric(II) tetrafluoroborate, (N,N'-diisopropyl-ethylenediamine cupric(II) tetrafluoroborate, (N,N'-di-n-butyl-ethylenediamine cupric(II) tetrafluoroborate, (N,N',di-t-butyl-ethylenediamine cupric(II) tetrafluoroborate, (N,N,N',N'-tetra-methylethylenediamine cupric(II) tetrafluoroborate, (N,N,N',N'-tetraethylethylenediamine cupric(II) tetrafluoroborate, (N,N,N',N'-tetrapropylethylenediamine cupric(II) tetrafluoroborate, (N,N,N',N'-tetraisopropylethylenediamine cupric(II) tetrafluoroborate, (N,N,N',N'-tetra-n-butylethylenediamine cupric(II) tetrafluoroborate, (N,N,N',N'-tetra-1-butylethylenediamine cupric(II) tetrafluoroborate, <H> propanediamine cupric(II)-type complexes

TABLE 11

(1,3-propanediamine cupric(II) chloride, (N,N'-dimethyl-1,3-pro-panediamine cupric(II) chloride, (N,N'-diethyl-1,3-propanediamine cupric(II) chloride, (N,N'-dipropyl-1,3-propanediamine cupric(II) chloride, (N,N'-diisopropyl-1,3-propanediamine cupric(II) chloride, (N,N'-di-n-butyl-1,3-propanediamine cupric(II) chloride, (N,N'-di-t-butyl-1,3-propanediamine cupric(II) chloride, (N,N,N',N'-tetramethyl-1,3-propanediamine cupric(II) chloride, (N,N,N',N'-tetramethyl-1,3-propanediamine cupric(II) chloride, (N,N,N',N'-tetrapropyl-1,3-propanediamine cupric(II) chloride, (N,N,N',N'-tetraisopropyl-1,3-propanediamine cupric(II) chloride, (N,N,N',N'-tetra-n-butyl-1,3-propanediamine cupric(II) chloride, (N,N,N',N'-tetra-1-butyl-1,3-propanediamine cupric(II) chloride, (1,3-propanediamine cupric(II) bromide, (N,N'-dimethyl-1,3-propanediamine cupric (II) bromide, (N,N'-diethyl-1,3-propane-diamine cupric(II) bromide, (N,N'-dipropyl-1,3-propanediamine cupric(II) bromide, (N,N'-diisopropyl-1,3-propanediamine cupric(II) bromide, (N,N'-di-n-butyl-1,3-propanediamine cupric(II) bromide, (N,N'-di-t-butyl-1,3-propanediamine cupric(II) bromide, (N,N,N'N'-tetramethyl-1,3-propanediamine cupric(II) bromide, (N,N,N',N'-tetraethyl-1,3-propanediaminecupric(II) bromide, (N,N,N',N'-tetra-propyl-1,3-propanediaminecupric(II) bromide, (N,N,N',N'-tetra-isopropyl-1,3-propanediaminecupric(II) bromide, (N,N,N',N'-tetra-n-butyl-1,3-propanediaminecupric(II) bromide, (N,N,N',N'-tetra-t-butyl-1,3-propanediaminecupric(II) bromide, (1,3-propanediamine cupric (II) perchlorate, (N,N'-dimethyl-1,3-propanediamine cupric(II) perchlorate, (N,N'-diethyl-1,3-propanediamine cupric(II) perchlorate, (N,N'-dipropyl-1,3-

TABLE 11-continued propanediamine cupric(II) perchlorate, (N,N'-diisopropyl-1,3-propanediamine cupric(II) perchlorate, (N,N'-di-n-butyl-1,3-propanediamine cupric(II) perchlorate, (N,N'-di-t-butyl-1,3-propanediamine cupric(II) perchlorate, (N,N,N',N'-tetramethyl-1,3-propanediamine cupric(II) perchlorate, (N,N,N',N'-tetraethyl-1,3-propanediamine cupric(II) perchlorate, (N,N,N',N'-tetrapropyl-1,3-propanediamine cupric(II) perchlorate, (N,N,N',N'-tetraisopropyl-1,3-propanediamine cupric(II) perchlorate, (N,N,N'N'-tetra-n-butyl-1,3-propanediamine cupric(II) perchlorate, (N,N,N',N'-tetra-t-butyl-1,3-propanediamine cupric(II) perchlorate,

TABLE 12

(1,3-propanediamine cupric(II) trifluoromethanesulfonate, (N,N'-dimethyl-1,3-propanediamine cupric(II) trifluoromethanesulfonate, (N,N'-diethyl-1,3-propanediamine cupric(II) trifluoromethanesulfonate, (N,N'-dipropyl-1,3-propanediamine cupric(II) trifluoromethanesulfonate, (N,N'-diisopropyl-1,3-propanediamine cupric(II) trifluoromethanesulfonate, (N,N'-diisopropyl-1,3-propanediamine cupric(II) trifluoromethanesulfonate, (N,N'-di-n-butyl-1,3-propane-diamine cupric(II) trifluoromethanesulfonate, (N,N'-di-t-butyl-1,3-propanediamine cupric(II) trifluoromethanesulfonate, (N,N,N',N'-tetramethyl-1,3-propanediamine cupric(II) trifluoromethanesulfonate, (N,N,N'N'-tetraethyl-1,3-propanediamine cupric(II) trifluoromethanesulfonate, (N,N,N',N'-tetrapropyl-1,3-propanediamine cupric(II) trifluoromethanesulfonate, (N,N,N'N'-tetraisopropyl-1,3-propanediamine cupric(II) trifluoromethanesulfonate, (N,N,N'N'-tetra-n-butyl-1,3-propanediamine cupric(II) trifluoromethanesulfonate, (N,N,N',N'-tetra-t-butyl-1,3-propanediamine cupric (II) trifluoromethanesulfonate, (1,3-propanediaminecupric(II)hexafluorophosphate, (N,N'-dimethyl-1,3-propanediamine cupric(II) hexafluorophosphate, (N,N'-diethyl-1,3-propanediamine cupric(II) hexafluorophosphate, (N,N'-dipropyl-1,3-propanediamine cupric(II) hexafluorophosphate, (N,N'-diisopropyl-1,3-propanediamine cupric(II) hexafluorophosphate, (N,N'-di-n-butyl-1,3-propanediamine cupric(II) hexafluorophosphate, (N,N'-di-t-butyl-1,3-propanediamine cupric(II) hexafluorophosphate, (N,N,N',N'-tetramethyl-1,3-propanediamine cupric (II) hexafluorophosphate, (N,N,N',N'-tetraethyl-1,3-propanediamine cupric(II) hexafluorophosphate, (N,N,N',N'-tetrapropyl-1,3-propanediamine cupric(II) hexafluorophosphate, (N,N,N',N'-tetra-isopropyl-1,3-propanediamine cupric(II) hexafluorophosphate, (N,N,N'-tetra-n-butyl-1,3-propanediamine cupric(II) hexafluoro-phosphate, (N,N,N',N'-tetra-1-butyl-1,3-propanediamine cupric(II) hexafluorophosphate, (1,3-propanediamine cupric(II) tetrafluoroborate, (N,N'-dimethyl-1,3-propanediamine cupric(II) tetrafluoroborate, (N,N'-diethyl-1,3-propanediamine cupric(II) tetrafluoroborate, (N,N'-dipropyl-1,3-propanediamine cupric(II) tetrafluoroborate (N,N'-diisopropyl-1,3-, propanediamine cupric(II) tetrafluoroborate, (N,N'-di-n-butyl-1,3-propanediamine cupric(II) tetrafluoroborate, (N,N'-di-t-butyl-1,3-propanediamine cupric(II) tetrafluoroborate, (N,N,N',N'-tetramethyl-1,3-propanediamine cupric(II) tetrafluoroborate, (N,N,N',N'-tetraethyl-1,3-propane diamine cupric(II) tetrafluoroborate, (N,N,N',N'-tetrapropyl-1,3-propanediamine cupric(II) tetrafluoroborate, (N,N,N',N'-tetraisopropyl-1,3-propanediamine cupric(II) tetrafluoroborate, (N,N,N',N'-tetra-n-butyl-1,3-propanediamine cupric(II) tetrafluoroborate, (N,N,N',N'-tetra-t-butyl-1,3-propane-diamine cupric(II) tetrafluoroborate, (1,3-propanediamine cupric(II) tetrafluoroborate, <I> cyclohexanediamine cupric(II)-type complexes

TABLE 13

(1,2-cyclohexanediamine cupric (II) chloride,
(N,N'-dimethyl-1,2-cyclohexanediamine cupric(II) chloride,
(N,N'-diethyl-1,2-cyclohexanediamine cupric(II) chloride,
(N,N'-dipropyl-1,2-cyclohexanediamine cupric(II) chloride,
(N,N'-diisopropyl-1,2-cyclohexanediamine cupric(II) chloride,
(N,N'-di-n-butyl-1,2-cyclohexanediamine cupric(II) chloride,
(N,N'-di-t-butyl-1,2-cyclohexanediamine cupric(II) chloride,
(N,N,N',N'-tetramethyl-1,2-cyclohexanediamine cupric(II) chloride,
(N,N,N',N'-tetraethyl-1,2-cyclohexanediamine cupric(II) chloride,
(N,N,N',N'-tetrapropyl-1,2-cyclohexanediamine cupric(II) chloride,

TABLE 13-continued (N,N,N',N'-tetraisopropyl-1,2-cyclohexanediamine cupric(II) chloride,
(N,N,N',N'-tetra-n-butyl-1,2-cyclohexanediamine cupric(II) chloride,
(N,N,N',N'-tetra-1-butyl-1,2-cyclohexanediaminecupric(II) chloride,
(1,2-cyclohexanediamine cupric(II) bromide,
(N,N'-dimethyl-1,2-cyclohexanediamine cupric(II) bromide,
(N,N'-diethyl-1,2-cyclohexanediamine cupric(II) bromide
(N,N'-dipropyl-1, 2-cyclohexanediamine cupric(II) bromide,
(N,N'-diisopropyl-1,2-cyclohexanediamine cupric(II) bromide,
(N,N'-di-n-butyl-1,2-cyclohexanediamine cupric(II) bromide,
(N,N'-di-t-butyl-1,2-cyclohexanediamine cupric(II) bromide,
(N,N,N',N'-tetramethyl-1,2-cyclohexanediamine cupric(II) bromide,
(N,N,N',N'-tetraethyl-1,2-cyclohexanediamine cupric(II) bromide,
(N,N,N',N'-tetrapropyl-1,2-cyclohexanediamine cupric(II) bromide,
(N,N,N',N'-tetraisopropyl-1,2-cyclohexanediamine cupric(II) bromide,
(N,N,N',N'-tetra-n-butyl-1,2-cyclohexanediaminecupric(II) bromide,
(N,N,N',N'-tetra-t-butyl-1,2-cyclohexanediaminecupric(II) bromide,
(1,2-cyclohexanediamine cupric(II) perchlorate,
(N,N'-dimethyl-1,2-cyclohexanediamine cupric(II) perchlorate,
(N,N'-diethyl-1,2-cyclohexanediamine cupric(II) perchlorate,
(N,N'-dipropyl-1,2-cyclohexanediamine cupric(II) perchlorate,
(N,N'-diisopropyl-1,2-cyclohexanediamine cupric(II) perchlorate,
(N,N'-di-n-butyl-1,2-cyclohexanediamine cupric(II) perchlorate,
(N,N'-di-t-butyl-1,2'cyclohexanediamine cupric(II) perchlorate,
(N,N,N',N'-tetramethyl-1,2-cyclohexanediamine cupric(II) perchlorate,
(N,N,N',N'-tetraethyl-1,2-cyclohexanediaminecupric(II) perchlorate,
(N,N,N',N'-tetrapropyl-1,2-cyclohexanediamine cupric(II) perchlorate,
(N,N,N',N'-tetraisopropyl-1,2-cyclohexanediamine cupric(II) perchlorate, (N,N,N',N'-tetra-n-butyl-1,2-cyclohexanediamine cupric(II) perchlorate,
(N,N,N',N'-tetra-t-butyl-1,2-cyclohexanediamine cupric(II) perchlorate,

TABLE 14

(1,2-cyclohexanediamine cupric(II) trifluoromethanesulfonate,
(N,N'-dimethyl-1,2-cyclohexanediamine cupric(II) trifluoromethanesulfonate, (N,N'-diethyl-1,2-cyclohexanediamine cupric(II) trifluoromethanesulfonate, (N,N'-dipropyl-1,2-cyclohexanediamine cupric(II) trifluoromethanesulfonate, (N,N'-diisopropyl-1,2-cyclo-hexanediamine cupric (II) trifluoromethanesulfonate, (N,N'-di-n-butyl-1,2-cyclohexanediamine cupric(II) trifluoromethanesulfonate, (N,N'-di-t-butyl-1,2-cyclohexanediamine cupric(II) trifluoromethanesulfonate, (N,N,N',N'-tetramethyl-1,2-cyclohexanediamine cupric (II) trifluoromethanesulfonate, (N,N,N',N'-tetraethyl-1,2-cyclohexanediamine cupric(II) trifluoromethanesulfonate, (N,N,N',N'-tetrapropyl-1,2-cyclohexanediamine cupric (II) trifluoromethanesulfonate, (N,N,N',N'-tetraisopropyl-1,2-cyclohexane-di-aminecupric(II) trifluoromethanesulfonate, (N,N,N',N'-tetra-n-butyl-1,2-cyclohexanediaminecupric(II) trifluoro-methanesulfonate, (N,N,N',N'-tetra-t-butyl-1,2-cyclohexanediamine cupric(II) trifluoroumethanesulfonate,
(1,2-cyclohexanediamine cupric(II) hexafluorophosphate, (N,N'-dimethyl-1,2-cyclohexanediamine cupric(II) hexafluorophosphate,
(N,N'-diethyl-1,2-cyclohexanediamine cupric (II) hexafluorophosphate, (N,N'-dipropyl-1,2-cyclohexanediamine cupric (II) hexafluorophosphate, (N,N'-diisopropyl-1,2-cyclohexanediamine cupric(II) hexafluorophosphate, (N,N'-di-n-butyl-1,2-cyclohexane-diamane cupric(II) hexafluorophosphate, (N,N'-di-n-butyl-1,2-cyclo-hexanediamine cupric(II) hexafluorophosphate, (N,N,N',N'-tetramethyl-1,2-cyclohexanediamine cupric(II) hexafluorophosphate, (N,N,N',N'-tetraethyl-1,2-cyclohexanediamine cupric(II) hexafluorophoaphate, (N,N,N',N'-tetrapropyl-1,2-cyclohexanediamine cupric(II) hexafluorophosphate,
(N,N,N',N'-tetraisopropyl-1,2-cyclohexanediamine cupric(II) hexafluorophosphate, (N,N,N',N'-tetra-n-butyl-1,2-cyclohexanediamine cupric(II) hexafluoro-phosohate, (N,N,N',N'-tetra-t-butyl-1,2-cyclohexanediamine cupric (II) hexafluorophosphate,
(1,2-cyclohexanediamine cupric(II) tetrafluoroborate,
(N,N'-dimethyl-1,2-cyclohexanediamine cupric (II) tetrafluoroborate,
(N,N'-diethyl-1,2-cyclohexanediamine cupric(II) tetrafluoroborate,
(N,N'-dipropyl-1,2-cyclohexanediamine cupric(II) tetrafluoroborate,
(N,N'-diisopropyl-1,2-cyclohexanediamine cupric(II) tetrafluoroborate, (N,N'-di-n-butyl-1,2-cyclohexanediamine cupric(II) tetrafluoroborate, (N,N'-di-t-butyl-1,2-

TABLE 14-continued cyclohexanediamine cupric(II) tetrafluoroborate, tetramethyl-1,2-cyclohexanedi-amine cupric(II) tetrafluoroborate, (N,N,N',N'-tetramethyl-1,2-cyclohexanediamine cupric(II) tetrafluoroborate, (N,N,N',N'-tetrapropyl-1,2-cyclohexamediamine cupric(II) tetrafluoroborate, (N,N,N',N'-tetraisopropyl-1,2-cyclohexanediamine cupric(II) tetrafluoroborate, (N,N,N',N'-tetra-n-butyl-1,2-cyclohexanediamine cupric(II) tetrafluoroborate, (N,N,N',N'-tetra-t-butyl-1,2-cyclohexanediamine cupric(II) tetrafluoroborate, <J> ((N,N'bis(aminoalkyl)-alkylenediamine) biscupric(II) chloride- type complexes

TABLE 15

(N,N'-bis(aminoethyl)-1,4-n-butanediamine) biscupric(II) chloride, ((N,N'-bis(2-(dimethylaminoethyl)-1,4-n-butanediamine) biscupric (II) chloride, ((N,N'-bis(2-(diethylaminoethyl)ethyl)-1,4-n-butanediamine) biscupric(II) chloride, ((N,N'-bis(2-(dipropylaminoethyl)propyl)-1,4-n-butanediamine) biscupric(II) chloride, ((N,N'-bis(2-(diisopropylaminoethyl)isopropyl)-1,4-n butanediamine)biscupric(II) chloride, ((N,N'-bis(2-(di-n-butylaminoethyl)-1,4-n-butanediamine)n-butyl) biscupric (II) chloride, ((N,N'-bis(2-(di-t-butylaminoethyl)t-butyl)-1,4-n-butane-diamine) biscupric(II) chloride, ((N,N'-bis(3-aminopropyl)-1,4-n-butanediamine) biscupric(II) chloride, ((N,N'-bis(3-(dimethylaminopropyl)methyl)-1,4-n-butanediamine) biscupric(II) chloride, ((N,N'-bis(3-(diethylamisopropyl)-1,4-n-butanediamine)ethyl)biscupric(II) chloride, ((N,N'-bis(3-(dipropylaminopropyl)propyl)-1,4-n-butanediamine)biscupric(II) chloride, ((N,N'-bis(3-(diisopropylaminopropyl)isopropyl)-1,4-n-butanediamine) biscupric (II) chloride, ((N,N'-bis(3-(di-n-butylaminopropyl)n-butyl)-1,4-n-butanediamine)biscupric(II) chloride, ((N,N'-bis(3-(di-t-butylaminopropyl)t-butyl)-1,4-n-butanediamine)biscupric(II) chloride, ((N,N'-bis(2-aminocyclohexyl)-1,4-n-butanediamine) biscupric(II) chloride, ((N,N'-bis(2-(dimethylaminocyclohexyl)methyl)-1,4-n-butanediamine) biscupric(II) chloride, ((N,N'-bis(2-(diethylaminocyclohexyl)ethyl)-1,4-n-butanediamine) biscupric(II) chloride, ((N,N'-bis(2-(dipropylaminocyclohexyl)propyl)-1,4-n-butanediamine) biscupric(II) chloride, ((N,N'-bis(2-(diisopropylaminocyclohexyl)isopropyl)-1,4-n-butanediamine)biscupric(II) chloride, ((N,N'-bis(2-(di-n-butylaminocyclohexyl)n-butyl)-1,4-n-butanediamine) biscupric(II) chloride, (N,N'-bis(2-(di-t-butylaminocyclohexyl)t-butyl)-1,4-n-butanediamine) biscupric(II) chloride, ((N,N',bis(2-aminoethyl)-1,5-n-pentanediamine) biscupric(II) chloride, ((N,N'-bis(2-dimethylaminoethyl)methyl)-1,5-n-pentamediamine) bis cupric(II) chloride, ((N,N'-bis(2-diethylaminoethyl)ethyl)-1,5-pentanediamine)bicupric(II) chloride, ((N,N'-bis(2-di-propylaminoethyl)propyl)-1,5-n-pentanediamine)bis cupric(II) chloride, ((N,N'-bis(2-diisopropylaminoethyl)isopropyl)-1,5-n-pentanediamine) biscupric(II) chloride, ((N,N'-bis(2-di-n-butylaminoethyl)-n-butyl)-1,5-n-pentanediamine) biscupric(II) chloride, ((N,N'-bis(2-di-t-butylaminoethyl)-t-butyl)-1,5-n-pentanediamine) biscupric(II) chloride,

TABLE 16

((N,N'-bis(3-aminopropyl)-1,5-n-pentanediamine) biscupric(II) chloride, ((N,N'-bis(3-aminopropyl)methyl)-1,5-n-pentanediamine)biscupric(II) chloride, ((N,N'-bis(3-(diethylaminopropyl)ethyl)-1,5-n-pentanediamine)biscupric(II) chloride, ((N,N'-bis(3-dipropylaminopropyl)propyl)-1,5-n-pentanediamine) biscupric (II) chloride, ((N,N'-bis(3-(diisopropylaminopropyl)isopropyl)-1,5-n-pentanediamine) bis cupric(II)chloride, ((N,N'-bis-(3-di-n-butylaminopropyl)n-butyl)-1,5-n-pentanediamine) biscupric(II) chloride, ((N,N'-bis(3-(di-t-butylaminopropyl)t-butyl)-1,5-n-pentanediamine)biscupric(II) chloride, ((N,N'-bis(2-aminocyclohexyl)-1,5-n-pentanediamine) biscupric(II) chloride, ((N,N'-bis(2-(dimethylaminocyclohexyl)methyl)-1,5-n-pentanediamine)biscupric(II) chloride, ((N,N'-bis(2-(diethylaminocyclohexyl)ethyl)-1,5-n-pentanediamine)biscupric(II) chloride, ((N,N'-bis(2-(dipropylaminocyclohexyl)propyl)-1,5-n-pentanediamine) biscupric(II) chloride, ((N,N'-bis(2-(dipropylaminocyclohexyl)propyl)-1,5-n-pentanediamine) biscupric(II) chloride, ((N,N'-bis(2-(diisopropylaminocyclohexyl)isopropyl)-1,5-n-pentanediamine) bis cupric(II)chloride, ((N,N'-bis(2-(di-n-butylaminocyclohexyl)-n-butyl)-1,5-n-pentanediamine) biscupric(II) chloride, ((N,N'-bis(2-(di-t-butylaminocyclohexyl)-t-butyl)-1,5-n-pentanediamine) biscupric(II) chloride, ((N,N'-bis(2-aminoethyl)-1,6-n-hexanediamine) biscupric(II) chloride, ((N,N'-bis(2-dimethylaminoethyl)methyl)-1,6-n-hexanediamine)biscupric (II) chloride, ((N,N'-bis(2-diethylaminoethyl)ethyl)-1,6-n-hexanediamine)biscupric(II) chloride, ((N,N'-bis(2-(di-propylaminoethyl)propyl)-1,6-n-hexanediamine) biscupric(II) chloride, ((N,N'-bis(2-(diisopropylaminoethyl)isopropyl)-1,6-n-hexanediamine)biscupric(II) chloride, ((N,N'-bis(2-(di-n-butylaminoethyl)n-butyl)-1,6-n-hexanediamine) biscupric(II) chloride, ((N,N'-bis(2-(di-t-butylaminoethyl)t-butyl)-1,6-n-hexanediamine) biscupric(II) chloride, ((N,N'-bis(3-aminopropyl)-1,6-n-hexanediamine) biscupric(II) chloride, ((N,N'-bis(3-(dimethylaminopropyl)methyl)-1,6-n-hexanediamine) biscupric(II) chloride, ((N,N'-bis(3-(diethylaminopropyl)ethyl)-1,6-n-hexanediamine)bis cupric(II) chloride, ((N,N'-bis(3-(dipropylaminopropyl)propyl)-1,6-n-hexanediamine) biscupric (II) chloride, ((N,N'-bis(3-(diisopropylaminopropyl)isopropyl)-1,6-n-hexanediamine) bis cupric(II) chloride, ((N,N'-bis(3-(di-n-butylaminopropyl)-n-butyl)-1,6-n-hexanediamine) biscupric(II) chloride, ((N,N'-bis(3-(di-t-butylaminopropyl)-t-butyl)-1,6-n-hexanediamine) biscupric(II) chloride, ((N,N'-bis(2-aminocyclohexyl)-1,6-n-hexanediamine) biscupric(II) chloride, ((N,N'-bis(2-(dimethylaminocyclohexyl)methyl)-1,6-n-hexanediamine)biscupric(II) chloride, ((N,N'-bis(2-(diethylaminocyclohexyl)ethyl)-1,6-n-hexanediamine)biscupric(II) chloride, ((N,N'-bis(2-(dipropylaminocyclohexyl)propyl)-1,6-n-hexanediamine) biscupric(II) chloride, ((N,N'-bis(2-diisopropylaminocyclohexyl)isopropyl)-1,6-n-hexanediamine)biscupric (II) chloride, ((N,N'-bis(2-(di-n-butylaminocyclohexyl)-n-butyl)-1,6-hexanediamine) biscupric(II) chloride, ((N,N'-bis(2-(di-t-butylaminocyclohexyl)t-butyl)-1,6-n-hexanediamine) bis cupric(II) chloride, <K> ((N,N'-bis(aminoalkyl)alkylenediamine) biscupric(II) bromide-type complexes

TABLE 17

((N,N'-bis(2-aminoethyl)-1,4-n-butanediamine) biscupric(II) bromide, ((N,N'-bis(2-dimethylaminoethyl)methyl)-1,4-n-butanedi-amine) biscupric(II) bromide, ((N,N'-bis(2-(diethylaminoethyl)ethyl)-1,4-n-butanediamine) biscupric(II) bromide, ((N,N'-bis(2-(dipropylaminoethyl)propyl)-1,4-n-butanediamine) biscupric(II) bromide, ((N,N'-bis(2-(diisopropylaminoethyl) isopropyl)-1,4-n-butanediamine) biscupric(II) bromide, ((N,N'-bis(2-(di-n-butylaminoethyl)-n,-butyl)-1,4-n-butanediamine) biscupric(II) bromide, ((N,N'-bis(2-(di-t-butylaminoethyl)-t-butyl)-1,4-n-butanediamine) bis cupric(II) bromide, ((N,N'-bis(3-aminopropyl)-1,4-n-butanediamine) biscupric(II) bromide, ((N,N'-bis(3-(dimethylaminepropyl)methyl)-1,4-n-butanediamine) bis cupric(II) bromide, ((N,N'-bis(3-(diethylaminopropyl)ethyl)-1,4-n-butanediamine) biscupric(II) bromide, ((N,N'-bis(3-(dipropylaminopropyl)propyl)-1,4-n-butanediamine) biscupric(II) bromide, ((N,N'-bis(3-(diisopropylaminopropyl)isopropyl)-1,4-n-butanediamine) biscupric(II) bromide, ((N,N'-bis(3-(di-n-butylaminopropyl)-n-butyl)-1,4-n-butanediamine) biscupric(II) bromide, ((N,N'-bis(3-(di-t-butylaminopropyl)-t-butyl)-1,4-n-butylediamine) biscupric(II) bromide, ((N,N'-bis(2-aminocyclohexyl)-1,4-n-butanediamine) biscupric(II) bromide, ((N,N'-bis(2-(dimethylaminocyclohexyl)methyl)-1,4-n-butanediamine) biscupric(II) bromide, ((N,N'-bis(2-(diethylaminocyclohexyl)ethyl)-1,4-n-butanediamine) biscupric(II) bromide, ((N,N'-bis(2-(dipropylaminocyclohexyl)propyl)-1,4-n-butanediamine)biscupric(II) bromide, ((N,N'-bis(2-(diisopropylaminocyclohexyl)isopropyl)-1,4-n-butanediamine)biscupric (II) bromide, ((N,N'-bis(2-(di-n-butylaminocyclohexyl)-n-butyl)-

TABLE 17-continued 1,4-n-butanediamine) biscupric(II) bromide, ((N,N'-bis(2-(di-t-butylaminocyclchexyl)-t-butyl)-1,4-n-butanediamine) biscupric(II) bromide,
((N,N'-bis(2-aminoethyl)-1,5-n-pentanediamine) biscupric(II) bromide, ((N,N'-bis(2-dimethylaminoethyl)methyl)-1,5-n-pentane-diamine) bis cupric(II) bromide, ((N,N'-bis(2-(diethylaminoethyl)ethyl)-1,5-n-pentanediamine)biscupric(II) bromide, ((N,N'-bis(2-(dipropylaminoethyl)propyl)-1,5-n-pentanediamine) biscupric(II) biscupric(II) bromide, ((N,N'-bis(2-(diisopropylaminoethyl)isopropyl)-1,5-n-pentanediamine) bis cupric(II) bromide, ((N,N'-bis-(2-di-n-butylaminoethyl)n-butyl)-1,5-n-pentanediamine) biscupric(II) bromide, ((N,N'-bis(2-(di-t-butylaminoethyl)t-butyl)-1,5-n-pentanediamine) bis cupric(II) bromide,

TABLE 18

((N,N'-bis(3-aminopropyl)-1,5-n-pentanediamine) biscupric(II) bromide, ((N,N'-bis(3-(dimethylaminopropyl)methyl)-1,5-n-pentanediamine) biscupric(II) bromide, ((N,N'-bis(3-(diethylaminopropyl)ethyl)-1,5-n-pentanediamine)biscupric(II) bromide, ((N,N'-bis(3-(dipropylaminopropyl)propyl)-1,5-n-pentanediamine) biscupric(II) bromide, ((N,N'-bis(3-(diisopropylaminopropyl)isopropyl)-1,5-n-pentanediamine) biscupric(II) bromide, ((N,N'-bis(3-(di-n-butylamaminopropyl)n-butyl)-1,5-n-pentanediamine) bicupric(II) bromide, ((N,N'-bis(3-(di-t-butylaminopropyl)t-butyl)-1,5-n-pentanediamine) biscupric(II) bromide,
((N,N'-bis(2-aminocyclohexyl)-1,5-n-pentanediamine) biscupric(II) bromide, ((N,N'-bis(2-(dimethylaminocyclohexyl)methyl)-1,5-n-pentanediamine) biscupric(II) bromide, ((N,N'-bis(2-(diethylaminocyclohexyl)ethyl)-1,5-n-pentanediamine) biscupric(II) bromide, ((N,N'-bis(2-(dipropylaminocyclohexyl)propyl)-1,5-n-pentanediamine)biscupric(II) bromide, ((N,N'-bis(2-(diisopropylaminocyclohexyl)isopropyl)-1,5-n-pentanediamine) bis cupric(II) bromide, ((N,N'-bis(2-(di-n-butylaminocyclohexyl)-n-butyl)-1,5-n-pentanediamine) biscupric(II) bromide, ((N,N'-bis(2-(di-t-butylaminocyclohexyl)-t-butyl)-1,5-n-pentanediamine) bis cupric(II) bromide,
((N,N'-bis(2-aminoethyl)-1,6-n-hexanediamine) biscupric(II) bromide, ((N,N'-bis(2-(dimethylaminoethyl)methyl)-1,6-n-hexanediamine) biscupric(II) bromide, ((N,N'-bis(2-(diethylaminoethyl)ethyl)-1,6-n-hexanediamine) biscupric(II) bromide, ((N,N'-bis(2-(dipropylaminoethyl)propyl)-1,6-n-hexanediamine) biscupric(II) bromide, ((N,N'-bis(2-(diisopropylaminoethyl)isopropyl)-1,6-n-hexanediamine) biscupric(II) bromide, ((N,N'-bis(2-(di-n-butylaminoethyl)-n-butyl)-1,6-n-hexanediamine)biscupric(II) bromide, ((N,N'-bis(2-(di-t-butylaminoethyl)-t-butyl)-1,6-n-hexanediamine) biscupric (II) bromide,
((N,N'-bis(3-aminopropyl)-1,6-n-hexanediamine) biscupric(II) bromide, ((N,N'-bis(3-dimethylaminopropyl)methyl-1,6-n-hexanediamine) bis cupric(II) bromide, ((N,N'-bis(3-diethylaminopropyl)-ethyl)-1,6-n-hexanediamine) biscupric(II) bromide, ((N,N'-bis(3-(dipropylamninopropyl)propyl)-1,6-n-hexanediamine) biscupric(II) bromide, ((N,N'-bis(3-(diisopropylaminopropyl)isopropyl)-1,6-n-hexanediamine)biscupric(II) bromide, ((N,N'-bis(3-(di-n-butylaminopropyl)n-butyl)-1,6-n-hexanediamine) biscupric(II) bromide, ((N,N'-bis(3-(di-t-butylaminopropyl)-t-butyl)-1,6-n-hexanediamine) biscupric(II) bromide,
((N,N'-bis(2-aminocyclcohexyl)-1,6-n-hexanediamine) biscupric(II) bromide, ((N,N'-bis(2-(dimethylaminocyclohexyl)methyl)-1,6-n-hexanediamine)biscupric(II) bromide, (diethylaminocyclohexyl)ethyl)-1,6-n-hexanediamine) bis cupric(II) bromide, ((N,N'-bis(2-(dipropylaminocyclohexyl)propyl)-1,6-n-hexanediamine) biscupric(II) bromide, ((N,N'-bis(2-((N,N'-bis(2-(diisopropylaminocyclohexyl)ispropyl)-1,6-n-hexanediamine) biscupric(II) bromide, ((N,N'-bis(2-(di-n-butylaminocyclohexyl)-n-butyl)-1,6-n-hexanediamine) bis cupric(II) bromide, ((N,N'-bis(2-(di-t-butylaminocyclohexyl)-t-butyl)-1,6-n-hexamediamine) biscupric(II) bromide, <L> ((N,N'-bis(aminoalkyl)-alkylenediamine) biscupric(II) perchlorate-type complexes

TABLE 19

((N,N'-bis(2-aminoethyl)-1,4-n-butanediamine) biscupric(II) perchlorate, (N,N'-bis(2-(dimethylaminoethyl)methyl)-1,4-n-butanediamine) biscupric(II) perchlorate, ((N,N'-bis(2-(diethylaminoethyl)ethyl)-1,4-n-butanediainine) biscupric(II) perchlorate, ((N,N'-bis(2-(dipropylaminoethyl)propyl)-1,4-n-butanediamine) biscupric(II) perchlorate, ((N,N'-bis(2-(diisopropylaminoethyl)isopropyl)-1,4-n-butanediamine) biscupric(II) perchlorate, ((N,N'-bis(2-(di-n-butylaminoethyl)-n-butyl)-1,4-n-butanediamine) biscupric(II) perchlorate, ((N,N'-bis(2-(di-t-butylaminoethyl)-t-butyl)-1,4-n-butanediamine) bis cupric(II) perchlorate,
((N,N'-bis(3-aminopropyl)-1,4-n-butanediamine) biscupric(II) perchlorate, ((N,N'-bis(3-dimethylaminopropyl)methyl)-1,4-n-butanediamine)biscupric(II) perchlorate, ((N,N'-bis(3-(diethylaminopropyl)ethyl)-1,4-n-butanediamine) biscupric(II) perchlorate, ((N,N'-bis(3-dipropylaminopropyl)propyl)-1,4-n-butanediamine) biscupric(II) perchlorate, ((N,N'-bis(3-(diisopropylaminopropyl)isopropyl)-1,4-n-butanediamine) bis cupric(II) perchlorate, ((N,N'-bis(3-(di-n-butylaminopropyl-n-butyl)-1,4-n-butanediamine) buscupric(II) perchlorate, ((N,N'-bis(3-(di-t-butylaminopropyl)-t-butyl)-1,4-n-butanediamine) biscupric(II) perchlorate,
((N,N'-bis(2-aminocyclohexyl)-1,4-n-butanediamine) biscupric(II) perchlorate, ((N,N'-bis(2-(dimethylaminocyclohexyl)methyl)-1,4-n-butanediamine) biscupric(II) perchlorate, ((N,N'-bis(2-(diethylaminocyclohexyl)ethyl-1,4-n-butanediamine) biscupric(II) perchlorate, ((N,N'-bis(2-(dipropylaminocyclohexyl)propyl)-1,4-n-butanediamine) biscupric(II) perchlorate, ((N,N'-bis(2-(diisopropylaminocyclohexyl)isopropyl)-1,4-n-butanediamine) bis cupric(II) perchlorate, ((N,N'-bis(2-(di-n-butylaminocyclohexyl)-n-butyl)-1,4-n-butanediamine) biscupric(II) perchlorate, ((N,N'-bis(2-(di-t-butylaminocyclohexyl)-t-butyl)1,4-n-butanediamine) bis cupric(II) perchlorate,
((N,N'-bis(2-aminoethyl)-1,5-n-pentanediamine) bis cupric(II) perchlorate, ((N,N'-bis(2-(dimethylaminoethyl)methyl)-1,5-n-pentanediamine) biscupric(II) perchlorate, ((N,N'-bis(2-(diethylaminoethyl)ethyl)-1,5-n-pentanediamine) biscupric(II) perchlorate,
((N,N'-bis(2-(dipropylaminoethyl)propyl)-1,5-n-pentanediamine) bis cupric(II) perchlorate, ((N,N'-bis(2-(diisopropylaminoethyl)isopropyl)-1,5-n-pentanediamine) bis cupric(II) perchlorate, ((N,N'-bis(2-(di-n-butylaminoethyl)-n-butyl)-1,5-n-pentanediamine) biscupric(II) perchlorate, ((N,N'-bis(2-(di-t-butylaminoethyl)-t-butyl)-1,5-n-pentanediamine) bis cupric(II) perchlorate,

TABLE 20

((N,N'-bis(3-aminopropyl)-1,5-n-pentanediamide) biscupric(II) per-chlorate, ((N,N'-bis(3-(dimethylaminopropyl)methyl)-1,5-n-pentanediamine) biscupric(II) perchlorate, ((N,N'-bis(3-(diethylaminopropyl)ethyl)-1,5-n-pentanediamine) biscupric(II) perchlorate, ((N,N''-bis(3-(dipropylaminopropyl)propyl)-1,5-n-pentanediamine) biscupric(II) perchlorate, ((N,N'-bis(3-(diisopropylaminopropyl)isopropyl)-1,5-n-pentanediamine) biscupric(II) perchlorate, ((N,N'-bis(3-(di-n-butylaminopropyl)n-butyl)-1,5-n,-pentanediamine) biscupric(II) perchlorate, ((N,N'-bis(3-(di-t-butylamaminopropyl)t-butyl)-1,5-n-pentanediamine) biscupric(II) perchlorate,
((N,N'-bis(2-aminocyclohexyl)-1,5-n-pentanediamine) biscupric(II) perchlorate, ((N,N'-bis(2-(dimethylaminocyclohexyl)methyl)-1,5-n-pentanediamine)biscupric(II) perchlorate, ((N,N'-bis(2-(diethylaminocyclohexyl)ethyl)-1,5-n-pentanediamine) biscupric(II) perchlorate, ((N,N'-bis(2-(dipropylaminocyclohexyl)propyl)-1,5-n-pentanediamine)biscupric(II) perchlorate, ((N,N'-bis(2-(diisopropylaminocyclohexyl)isopropyl)-1,5-n-pentanediamine) biscupric(II) perchlorate, ((N,N'-bis(2-(di-n-butylaminocyclohexyl)-n-butyl)-1,5-n-pentanediamine) biscupric(II) perchlorate, ((N,N'-bis(2-(di-t-butylaminocyclohexyl)-t-butyl)-1,5-n-pentanediamine) biscupric(II) perchlorate,
((N,N'-bis(2-aminoethyl)-1,6-n-hexenediamine) biscupric(II) perchlorate, ((N,N'-bis(2-(dimethylaminoethyl)methyl)-1,6-n-hexanediamine) biscupric(II) perchlorate, ((N,N'-bis(2-(diethylaminoethyl)ethyl)-1,6-n-hexanediamide) biscupric(II)

TABLE 20-continued perchlorate, ((N,N'-bis(2-(dipropylaminoethyl)propyl)-1,6-n-hexanediamine) biscupric(II) perchlorate, ((N,N'-bis(2-(diisopropylaminoethyl)isopropyl)-1,6-n-hexanediamine) biscupric(II) perchlorate, ((N,N'-bis(2-(di-n-butylaminoethyl)-n-butyl)-1,6-n-hexanediamine) biscupric(II) per-chlorate, ((N,N'-bis(2-(di-t-butylaminoethyl)-t-butyl)-1,6-n-hexane-diamine) biscupric(II) perchlorate,
((N,N'-bis(3-aminopropyl)-1,6-n-hexanediamine) biscupric(II) perchlorate, ((N,N'-bis(3-(dimethylaminopropyl)methyl)-1,6-n-hexane-diamine) biscupric(II) perchlorate, ((N,N'bis(3-(diethylaminopropyl)ethyl)-1,6-n-hexanediamine) biscupric(II) perchlorate, ((N,N'-bis(3-(dipropylaminopropyl)propyl)-1,6-n-hexanediamine) biscupric(II) perchlorate, ((N,N'-bis(3-(diisopropylaminopropyl)isopropyl)-1,6-n-hexanediamine) bis cupric(II) perchlorate, ((N,N'-bis(3-(di-n-butylaminopropyl)-n-butyl)-1,6-n-hexanedianeine) biscupric(II) perchlorate, ((N,N'-bis(3-(di-t-butylaminopropyl)-t-butyl)-1,6-n-hexanediamide) biscupric(II) perchlorate,
((N,N'-bis(2-aminocyclohexyl)-1,6-n-hexanediamine) biscupric(II) perchlorate, ((N,N'-bis(2-(dimethylaminocyclohexyl)methyl)-1,6-n-hexanediamine) biscupric(II) perchlorate, ((N,N'-bis(2-(diethylaminocyclohexyl)ethyl)-1,6-n-hexanediamine) biscupric(II) perchlorate, ((N,N'-bis(2-(dimpropylaminocyclohexyl)propyl)-1,6-n-hexanediamine) biscupric(II) perchlorate, ((N,N'-bis(2-(diisopropylaminocyclohexyl)isopropyl)-1,6-n-hexanediamine) bis cupric (II) perchlorate, ((N,N'-bis(2-(di-n-butylaminocyclohexyl)-n-butyl)-1,6-n-hexanediamine) biscupric(II) perchlorate, ((N,N'-bis(2-(di-t-butylaminocyclohexyl)-t-butyl)-1,6-n-hexanediamine) biscupric (II) perchlorate, <M> ((N,N'-bis(aminoalkyl)alkylenediamine) biscupric(II) trifluoromethanesulfonate-type complexes

TABLE 21

((N,N'-bis(2-aminoethyl)-1,4-n-butanediamine) biscupric(II) trifluoromethanesulfonate, ((N,N'-bis(2-(dimethylaminoethyl)methyl)-1,4-n-butanediamine) biscupric(II) trifluoromethanesulfonate, ((N,N'-bis(2-(diethylaminoethyl)ethyl)-1,4-n-butanediamine) biscupric(II) trifluoromethanesulfonate, ((N,N'-bis(2-(dipropylaminoethyl)propyl)-1,4-n-butanediamine) biscupric(II) trifluoromethanesulfonate, ((N',N'-bis(2-(diisopropylaminoethyl)isopropyl)-1,4-n-butanediamine) biscupric(II) trifluoromethanesulfonate, ((N,N'-bis(2-(di-n-butylaminoethyl)-n-butyl)-1,4-n-butanediamine) biscupric(II) trifluoromethanesulfonate, ((N,N'-bis(2-(di-t-butylaminoethyl)-t-butyl)-1,4-n-butanediamine) biscupric(II) trifluoromethanesulfonate,
((N,N'-bis(3-aminopropyl)-1,4-n-butanediamine) bis cupric(II) trifluoromethanesulfonate, ((N,N'-bis(3-(dimethylaminopropyl)methyl-1,4-n-butanediamine) biscupric(II) trifluoromethanesulfonate, ((N,N'-bis(3-(diethylaminopropyl)ethyl)-1,4-n-butanediamine) bisupric(II) trifluoromethanesulfonate, ((N,N'-bis(3-(dipropylaminopropyl)propyl)-1,4-n-butanediamine) biscupric(II) trifluoromethanesulfonate, ((N,N'-bis(3-(diisopropylaminopropyl)isopropyl)-1,4-n-butanediamine) biscupric(II) trifluoromethanesulfonate, ((N,N'-bis(3-(di-n-butylaminopropyl)n-butyl)-1,4-n-butanediamine biscupric(II) trifluoromethanesulfonate, ((N,N'-bis(3-(di-t-butylaminopropyl)-t-butyl-1,4-n-butanediamine) biscupric(II) trifluoromethanesulfonate,
((N,N'-bis(2-aminocyclohexyl)-1,4-n-butanediamine) biscupric(II) trifluoromethanesulfonate, ((N,N'-bis(2-(dimethylaminocyclohexyl)methyl-1,4-n-butanediamine) biscupric(II) trifluoromethanesulfonate, ((N,N'-bis(2-(diethylaminocyclohexyl)ethyl)-1,4-n-butanediamine) biscupric(II) trifluoromethanesulfonate, ((N,N'-bis(2-(dipropylaminocyclohexyl)propyl)-1,4-n-butanediamine) biscupric(II) trifluoromethanesulfonate, ((N,N'-bis(2-(dimethylaminocyclohexyl)methyl)-1,4-n-butanediamine) biscupric(II) trifluoromethanesulfonate, ((N,N'-bis(2-diisopropylaminocyclohexyl)isopropyl)-1,4-n-butanediamine) biscupric(II) trifluoromethanesulfonate, ((N,N'-bis(2-butylaminocyclohexyl)-n-butyl)1,4-n-butanediamine) biscupric(II) trifluoromethanesulfonate, ((N,N'-bis(2-(di-t-butylaminocyclohexyl)-t-butyl)-1,4-n-butanediamine) biscupric(II) trifluoromethanesulfonate,

TABLE 22

((N,N'-bis(2-aminoethyl)-1,5-n-pentanediamine) biscupric(II) trifluoromethanesulfonate, ((N,N'-bis(2-(dimethylaminoethyl)methyl)-1,5-n-pentanediamine) biscupric(II) trifluoromethanesulfonate, ((N,N'-bis(2-(diethylaminoethy,)ethyl)-1,5-n-pentanediamide) biscupric(II) trifluoromethanesulfonate, ((N,N'-bis(2-(dipropylaminoethyl)propyl)-1,5-n-pentanediamine) biscupric(II) trifluoromethanesulfonate, ((N,N'-bis(2-(diisopropylaminoethyl)isopropyl)-1,5-n-pentanediamine) biscupric(II) trifluoramethanesulfonate, ((N,N'-bis(2-(di-n-butylaminoethyl)-n-butyl)-1,5-n-pentanediamine) biscupric(II) trifluoromethanesulfonate ((N,N'-bis(2-(di-t-butylaminomethyl)-t-butyl)-1,5-n-pentanediamine) biscupric(II) trifluoromethanesulfonate,
((N,N'-bis(3-aminopropyl)-1,5-n-pentanediamine) biscupric(II) trifluoromethanesulfonate, ((N,N'-bis(3-(dimethylaminopropyl)-methyl)-1,5-n-pentanediamine) biscupric(II) trifluoromethanesulfonate, ((N,N'-bis(3-(diethylaminopropyl)ethyl)-1,5-n-pentanediamine) biscupric(II) trifluoromethanesulfonate, ((N,N'-bis(3-(dipropylaminopropyl)propyl)-1,5-n-pentanediamine) bis cupric(II) trifluoromethanesulfonate, ((N,N'-bis(3-(diisopropylaminopropyl)isopropyl)-1,5-n-pentanediamine) bis cupric(II) trifluoromethanesulfonate, ((N,N'-bis(3-(di-n-butylaminopropyl)-n-butyl)-1,5-n-pentanediamine) biscupric(II) trifluoromethanesulfonate, ((N,N'-bis(3-(di-t-butylaminopropyl)-t-butyl)-1,5-n-pentanediamine) bis-cupric (II) trifluoromethanesulfonate,
((N,N'-bis(2-aminocyclohexyl)-1,5-n-pentanediamine) biscupric(II) trifluoromethanesulfonate, ((N,N'-bis(2-(dimethylaminocyclohexyl) methyl)-1,5-n-pentanediamine) biscupric(II) trifluoromethansulfonate, ((N,N'-bis(2-(diethylaminocyclohexyl) ethyl-1,5-n-pentanediamine) biscupric(II) trifluoromethanesulfonate, ((N, N'-bis(2-(dipropylaminocyclohexyl)propyl)-1,5-n-pentanediamine) biscupric(II) trifluoromethanesulfonate, ((N,N'-bis(2-(diisopropylaminocyclohexyl)isopropyl)-1,5-n-pentanediamine) bis cupric(II) trifluoromethanesulfonate, ((N,N'-bis(2-(di-n-butylaminocyclohexyl)-n-butyl)-1,5-n-pentanediamine) biscupric(II) trifluoromethanesulfonate, ((N,N'-bis(2-(di-t-butylaminocyclohexyl)-t-butyl)-1,5-n-pentanediamine) biscupric(II) trifluoromethansulfonate,

TABLE 23

((N,N'-bis(2-aminoethyl)-1,6-n-hexanediamine) biscupric(II) trifluoromethanesulfonate, ((N,N'-bis(2-(dimethylaminoethyl)methyl)-1,6-n-hexanediamide) biscupric(II) trifluoromethanesulfonate, ((N,N'-bis(2-(diethylaminoethyl)ethyl)-1,6-n-hexanediamine) biscupric(II) trifluoromethanesulfonate, ((N,N'-bis (2-(dipropylaminoethyl)propyl)-1,6-n-hexanediamine) biscupric(II) trifluoromethanesulfonate, ((N,N'-bis(2-(diisopropylaminoethyl)isopropyl)-1,6-n-hexanediamine) bis cupric(II) trifluoromethanesulfonate, ((N,N'-bis(2-(di-n-butylaminoethyl)-n-butyl)-1,6-n-hexanediamine) biscupric(II) trifluoromethanesulfonate, ((N,N'-bis(2-(di-t-butylaminoethyl)-t-butyl)-1,6-n-hexanediamine) bis cupric(II) trifluoromethanesulfonate,
((N,N'-bis(3-aminopropyl)-1,6-n-hexanediamine) biscupric(II) trifluoromethanesulfonate, ((N,N'-bis(3-(dimethylaminopropyl)-methyl)-1,6-n-hexanediamine) biscupric(II) trifluoromethanesulfonate, ((N,N'-bis(3-(diethylaminopropyl)ethyl)-1,6-n-hexanediamine) bis cupric(II) trifluoromethanesulfonate, ((N,N'-bis(3-(dipropylaminopropyl)propyl)-1,6-n-hexanediamine) biscupric(II) trifluoromethanesulfonate, ((N,N'-bis(3-(diisopropylaminopropyl)isopropyl-1,6-n-hexanediamine) bis cupric(II) trifluoromethanesulfonate, ((N,N'-bis(3-(di-n-butylaminopropyl-n-butyl_1,6-n-hexanediamine) biscupric(II) trifluoromethanesulfonate, ((N,N'-bis(3-(di-t-butylaminopropyl)-t-butyl)-1,6-n-hexanediamine) biscupric (II) trifluoromethanesulfonate,
((N,N'-bis(2-aminocyclohexyl)-1,6-n-hexanediamine) biscupric(II) trifluoromethanesulfonate, ((N,N'-bis(2-(dimethylaminocyclohexyl)-methyl)-1,6-n-hexanediamine) biscupric(II) trifluoromethanesulfonate, ((N,N'-bis(2-(diethylaminocyclohexyl)ethyl)-1,6-n-hexa-nediamine) biscupric(II) trifluoromethanesulfonate, ((N,N'-bis(2-(dipropylaminocyclohexyl)propyl)-1,6-n-hexanediamine) biscupric(II) trifluoromethanesulfonate, ((N,N'-bis(2-(diisopropylaminocyclohexyl)isopropyl)-1,6-n-hexanediamine) bis cupric(II) trifluoromethanesulfonate, ((N,N'-bis(2-(di-n-butylaminocyclohexyl)-n-butyl)-1,6-n-hexanediamine) biscupric(II) trifluoromethanesulfonate, ((N,N'-bis(2-(di-t-butylaminocyclohexyl)-t-butyl)-1,6-n-hexanedi-amine) bis cupric(II) trifluoromethanesulfonate, <N> ((N,N'-bis(aminoalkyl)-alkylenediamine) biscupric(II) hexafluorophosphate-type complexes

TABLE 24

((N,N'-bis(2-aminoethyl)-1,4-n-butanediamine) biscupric(II) hexafluorophosphate, ((N,N'-bis (2-(dimethylaminoethyl)methyl)-1,4-n-butanediamine) biscupric(II) hexafluorophosphate, ((N,N'-bis(2-(diethylaminoethyl)ethyl)-1,4-n-butanediamine) biscupric(II) hexafluorophosphate, ((N',N'-bis(2-(dipropylaminoethyl)propyl)-1,4-n-butanediamine)biscupric(II) hexafluorophosphate, ((N,N'-bis(2-(diisopropylaminoethyl)isopropyl)-1,4-n-butanediamine) biscupric (II) hexafluorophosphate, ((N,N'-bis(2-(di-n-butylaminoethyl)-n-butyl)-1,4-n-butanediamine) biscupric(II) hexafluorophosphate, ((N,N'-bis(2-(di-t-butylaminoethyl)-t-butyl)-1,4-n-butanediamine) biscupric(II) hexafluorophosphate, ((N,N'-bis(3-aminopropyl)-1,4-n-butanediamine) bis cupric(II) hexafluorophosphate, ((N,N'-bis(3-(dimethylaminopropyl)methyl)-1,4-n-butanediamine) biscupric(II) hexafluorophosphate, ((N,N'-bis(3-(diethylaminopropyl)ethyl)-1,4-n-butanediamine) biscupric(II) hexafluorophosphate, ((N,N'-bis(3-(dipropylaminopropyl)propyl)-1,4-n-butanediamine) biscupric(II) hexafluorophosphate, ((N,N'-bis(3-(diisopropylaminopropyl)isopropyl)-1,4-n-butanediamine) bis cupric(II) hexafluorophosphate, ((N,N'-bis(3-(di-n-butylaminopropyl)-n-butyl)-1,4-n-butanediamine) biscupric (II) hexafluorophosphate, ((N,N'-bis(3-(di-t-butylaminopropyl)-t-butyl)-1,4-n-butanediamine) biscupric(II) hexafluorophosphate, ((N,N'-bis(2-aminocyclohexyl)-1,4-n-butanediamine) biscupric(II) hexafluorophosphate, ((N,N'-bis(2-(dimethylaminocyclohexyl)methyl)-1,4-n-butanediamine) biscupric(II) hexafluorophosphate, ((N,N'-bis(2-(diethylaminocyclohexyl)ethyl)-1,4-n-butanediamine) biscupric(II) hexafluorophosphate, ((N,N'-bis(2-(dipropylaminocyclohexyl)propyl)-1,4-n-butanediamine) biscupric(II) hexafluorophosphate, ((N,N'-bis(2-(diisopropylaminocyclohexyl)isopropyl)-1,4-n-butanediamine) bis cupric(II) hexafluorophosphate, ((N,N'-bis(2-(di-n-butylaminocyclohexyl)-n-butyl)-1,4-n-butanediamine) biscupric(II) hexafluorophosphate, ((N,N'-bis(2-(di-t-butylaminocyclohexyl)-t-butyl)-1,4-n-butanediamine) biscupric(II) hexafluorophosphate, ((N,N'-bis(2-aminoethyl)-1,5-n-pentanediamine) biscupric(II) hexafluorophosphate, ((N,N'-bis(2-dimethylaminoethyl)methyl)-1,5-n-pentanediamine) biscupric(II) hexafluorophosphate, ((N,N'-bis(2-(diethylaminoethyl)ethyl)-1,5-n-pentanediamine) biscupric(II) hexafluorophosphate, ((N,N'-bis(2-(dipropylaminoethyl)propyl)-1,5-n-pentanediamine) biscupric(II) hexafluorophosphate, ((N,N'-bis(2-(diisopropylaminoethyl)isopropyl)-1,5-n-pentanediamine) bis cupric(II) hexafluorophosphate, ((N,N'-bis(2-(di-n-butylaminoethyl)-n-butyl)-1,5-n-pentanediamine) biscupric(II) hexafluorophosphate, ((N,N'-bis(2-(di-t-butylaminoethyl)-t-butyl)-1,5-n-pentanediamine) biscupric(II) hexafluorophosphate,

TABLE 25

((N,N'-bis(3-aminopropyl)-1,5-n-pentanediamine) bis cupric(II) hexafluorophosphate, ((N,N'-bis(3-(dimethylaminopropyl)methyl)-1,5-n-pentanediamine) biscupric(II) hexafluorophosphate, ((N,N'-bis(3-(diethylaminopropyl)ethyl)-1,5-n-pentanediamine) biscupric (II) hexafluorophosphate, ((N,N'-bis(3-(dipropylaminopropyl)propyl)-1,5-n-pentanediamine)biscupric(II) hexafluorophosphate, ((N,N'-bis(3-(diisopropylaminopropyl)isopropyl)-1,5-n-pentanediamine) bis cupric(II) hexafluorophosphate, ((N,N'-bis(3-(diisopropylaminopropyl)isopropyl)-1,5-n-pentanediamine) bis cupric(II) hexafluorophosphate, ((N,N'-bis(3-(di-n-butylaminopropyl)-n-butyl)-1,5-n-pentanediamine) biscupric(II) hexafluorophosphate, ((N,N'-bis(3-(di-t-butylaminopropyl)-t-butyl)-1,5-n-pentanediamine) biscupric(II) hexafluorophosphate, ((N,N'-bis(2-aminocyclohexyl)-1,5-n-pentanediamine) biscupric(II) hexafluorophosphate, ((N,N'-bis(2-(dimethylaminocyclohexyl)methyl)-1,5-n-pentanediamine) biscupric(II) hexafluorophosphate, ((N,N'-bis(2-(diethylaminocyclohexyl)ethyl)-1,5-n-pentanediamine) bis cupric(II) hexafluorophosphate, ((N,N'-bis(2-(dipropylaminocyclohexyl)propyl)-1,5-n-pentanediamine biscupric(II) hexafluorophosphate, ((N,N'-bis(2-(diisopropylaminocyclohexyl)isopropyl)-1,5-n-pentanediamine) bis cupric(II) hexafluorophosphate, ((N,N'-bis(2-(di-n-butylaminocyclohexyl-n-butyl)-1,5-n-pentanediamine) biscupric(II) hexafluorophosphate,((N,N'-bis(2-(di-t-butylaminocyclohexyl)-t-butyl)-1,5-n-pentanediamine) biscupric(II) hexafluorophosphate, ((N,N'-bis(2-aminoethyl)-1,6-n-hexanediamine) bis cupric(II) hexafluorophosphate, ((N,N'-bis(2-(dimethylaminoethyl)methyl)-

TABLE 25-continued 1,6-n-hexanediamine)biscupric(II)hexafluorophosphate, ((N,N'-bis(2-(diethylaminoethyl)ethyl)-1,6-n-hexanediamine) biscupric (II) hexafluorophosphate, ((N,N'-bis(2-(dipropylaminoethyl)propyl)-1,6-n-hexanediamine) biscupric(II) hexafluorophosphate, ((N,N'-bis(2-(diisopropylaminoethyl)isopropyl)-1,6-n-hexanediamine) biscupric(II)hexafluorophosphate, ((N,N'-bis(2-(di-n-butylaminoethyl)-n-butyl)-1,6-n-hexanediamine) biscupric(II) hexafluorophospahte, ((N,N'-bis(2-(di-t-butylaminoethyl)-t-butyl)-1,6-n-hexanediamine) biscupric(II) hexafluorophosphate, ((N,N'-bis(3-aminopropyl)-1,6-n-hexanediamine) bis cupric(II) hexafluorophosphate, ((N,N'-bis(3-(dimethylaminopropyl)methyl)-1,6-n-hexanediamine) bis cupric(II) hexafluorophosphate, ((N,N'-bis(3-(diethylaminopropyl)ethyl)-1,6-n-hexanediamine) biscupric (II) hexafluorophosphate, ((N,N'-bis(3-(dipropylaminopropyl)-propyl)-1,6-n-hexanediamine) biscupric (II) hexafluorophosphate, ((N,N'-bis(3-(diisopropylaminopropyl)isopropyl)-1,6-n-hexanediamine) biscupric(II) hexafluorophosphate, ((N,N'-bis(3-(di-n-butylaminopropyl)-n-butyl)-1,6-n-hexanediamine) biscupric(II) hexafluorophosphate, ((N,N'-bis(3-(di-t-butylaminopropyl)-t-butyl)-1,6-n-hexanediamine) biscupric(II) hexafluorophosphate,

TABLE 26

((N,N'-bis(2-aminoethyl)-1,5-n-pentanediamine) biscupric(II) hexafluorophosphate, ((N,N'-bis(2-(dimethylaminoethyl)methyl)-1,5-n-pentanediamine) biscupric(II) hexafluorophosphate, ((N,N'-bis(2-(diethylaminoethyl)ethyl-1,5-n-pentanediamine) biscupric(II) hexafluorophosphate, ((N,N'-bis(2-(dipropylaminoethyl)propyl)-1,5-n-pentanediamine) biscupric(II) hexafluorophosphate, ((N,N'-bis(2-(diisopropylaminoethyl)isopropyl)-1,5-n-pentanediamine) bis cupric(II) hexafluorophosphate, ((N,N'-bis(2-(di-n-butylaminoethyl)-n-butyl)-1,5-n-pentanediamine) biscupric(II) hexafluorophosphate, ((N,N'-bis(2-di-t-butylaminoethyl)-t-butyl)-1,5-n-pentanediamine) biscupric(II) hexafluorophosphate, ((N,N'-bis(3-aminopropyl)-1,5-n-pentanediamine) bis cupric(II) hexafluorophosphate, ((N,N'-bis(3-(dimethylaminopropyl)methyl)-1,5-n-pentanediamine) biscupric(II) hexafluorophosphate, ((N,N'-bis(3-(diethylaminopropyl)ethyl)-1,5-n-pentanediamine) biscupric (II) hexafluorophosphate, ((N,N'-bis(3-(dipropylaminopropyl)propyl)-1,5-n-pentanediamine) biscupric(II) hexafluorophosphate, ((N,N'-bis(3-(diisopropylaminopropyl)isopropyl)-1,5-n-pentanediamine) biscupric(II) hexafluorophosphate, ((N,N'-bis(3-(di-n-butylaminopropyl)-n-butyl)-1,5-n-pentanediamine) biscupric(II) hexafluorophosphate, ((N,N'-bis(3-(di-t-butylaminopropyl)-t-butyl)-1,5-n-pentanediamine) biscupric(II) hexafluorophosphate, ((N,N'-bis(2-aminocyclohexyl)-1,5-n-pentanediamine) biscupric(II) hexafluorophosphate, ((N,N'-bis(2-(dimethylaminocyclohexyl)-methyl)-1,5-n-pentanediamine) biscupric(II) hexafluorophosphate, ((N,N'-bis(2-diethylaminocyclohexyl)ethyl)-1,5-n-pentanediamine) bis cupric(II) hexafluorophosphate, ((N,N'-bis(2-(dipropylaminocyclohexyl)propyl)-1,5-n-pentanediamine) biscupric(II) hexafluorophosphate, ((N,N'-bis(2-(diisopropylaminocyclohexyl) isopropyl)-1,5-n-pentanediamine) biscupric(II) hexafluorophosphate, ((N,N'-bis(2-(di-n-butylaminocyclohexyl)-n-butyl)-1,5-n-pentanediamine) bis cupric(II) hexafluorophosphate, ((N,N'-bis(2-(di-t-butylaminocyclohexyl)-t-butyl)-1,5-n-pentanediamine) bis cupric(II) hexafluorophosphate,

TABLE 27

((N,N'-bis(2-aminoethyl)-1,6-n-hexanediamine) bis cupric(II) hexafluorophosphate, ((N,N'-bis(2-(dimethylaminoethyl)methyl)-1,6-n-hexanediamine) biscupric(II)hexafluorophosphate, ((N,N'-bis(2-(diethylaminoethyl)ethyl)-1,6-n-hexanediamine) biscupric(II) hexafluorophosphate, ((N,N'-bis(2-(dipropylaminoethyl)propyl)-1,6-n-hexanediamine) biscupric(II) hexafluorophosphate, ((N,N'-bis(2-(diisopropylaminoethyl)isopropyl)-1,6-n-hexanediamine) biscupric (II) hexafluorophosphate, ((N,N'-bis(2-(di-n-butylaminoethyl)-n-butyl)-1,6-n-hexanediamine) biscupric(II) hexafluorophosphate, ((N,N'-bis(2-(di-t-butylaminoethyl)-t-butyl)-1,6-n-hexanediamine) biscupric(II) hexafluorophosphate, ((N,N'-bis(3-aminopropyl)-1,6-n-hexanediamine) bis cupric(II) hexafluorophosphate, ((N,N'-bis(3-(dimethylaminopropyl)methyl)-1,6-n-hexanediamine) biscupric(II) hexafluorophosphate, ((N,N'-bis(3-

TABLE 27-continued (diethylaminopropyl)ethyl)-1,6-n-hexanediamine) biscupric(II) hexafluorophosphate, ((N,N'-bis(3-(dipropylaminopropyl)propyl)-1,6-n-hexanediamine) biscupric(II)hexafluorophosphate, ((N,N'-bis(3-(diisopropylaminopropyl)isopropyl)-1,6-n-hexanediamine) bis cupric(II)hexafluorophosphate, ((N,N'-bis(3-(di-n-butylaminopropyl)-n-butyl)-1,6-n-hexanediamine) biscupric(II) hexafluorophosphate, ((N,N'-bis(3-(di-t-butylaminopropyl)-t-butyl)-1,6-n-hexanediamine) biscupric(II) hexafluorophosphate,
((N,N'-bis(2-aminocyclohexyl)-1,6-n-hexanediamine) biscupric(II) hexafluorophosphate, ((N,N'-bis(2-(dimethylaminocyclohexyl)-methyl-1,6-n-hexanediamine) bis cupric(II) hexafluorophosphate, ((N,N'-bis(2-(diethylaminocyclohexyl)ethyl)-1,6-n-hexanediamine) biscupric(II) hexafluorophosphate, ((N,N'-bis(3-(dipropylaminocyclohexyl)propyl)-1,6-n-hexanediamine) biscupric(II)hexafluorophosphate, ((N,N'-bis(2-(diisopropylaminocyclohexyl)isopropyl)-1,6-n-hexanediamine) bis cupric(II)hexafluorophosphate, ((N,N'-bis(2-(di-n-butylaminocyclohexyl)-n-butyl)-1,6-n-hexanediamine) biscupric(II) hexafluorophosphate, ((N,N'-bis(2-(di-t-butylaminocyclohexyl)-t-butyl)-1,6-n-hexanediamine) biscupric(II) hexafluorophosphate, <O> ((N,N'-bis(aminoalkyl)-alkylenediamine) biscupric(II) tetrafluoroborate-type complexes

TABLE 28

((N,N'-bis(2-aminoethyl)-1,4-n-butanediamine) bis cupric(II) tetrafluoroborate, ((N,N'-bis(2-(dimethylaminoethyl)methyl)-1,4-n-butanediamine) bis cupric(II) tetrafluoroborate, ((N,N'-bis(2-(diethyl-aminoethyl)ethyl)-1,4-n-butanediamine) bis cupric(II) tetrafluoroborate, ((N,N'-bis(2-(dipropylaminoethyl)propyl)-1,4-n-butanediamine) bis cupric(II) tetrafluoroborate, ((N,N'-bis(2-(diisopropylaminoethyl)isopropyl)-1,4-n-butanediamine) bis cupric(II) tetrafluoroborate, ((N,N'-bis(2-(di-n-butylaminoethyl)-n-butyl)-1,4-n-butanediamine) bis cupric(II) tetrafluoroborate, ((N,N'-bis(2-(di-t-butylaminoethyl)-t-butyl)-1,4-n-butanediamine) biscupric(II) tetrafluoroborate,
((N,N'-bis(3-aminopropyl)-1,4-n-butanediamine) bis cupric(II) tetrafluoroborate, ((N,N'-bis(3-(dimethylaminopropyl)methyl)-1,4-n-butanediamine) bis cupric(II) tetrafluoroborate, ((N,N'-bis(3-(diethylaminopropyl)ethyl)-1,4-n-butanediamine) bis cupric(II) tetrafluoroborate, ((N,N'-bis(3-(dipropylaminopropyl)propyl)-1,4-n-butanediamine) bis cupric(II) tetrafluoroborate, ((N,N'-bis(3-(diisopropylaminopropyl)isopropyl)-1,4-n-butanediamine) bis cupric(II) tetrafluoroborate, ((N,N'-bis(3-(di-n-butylaminopropyl)-n-butyl)-1,4-n-butanediamine) biscupric(II) tetrafluoroborate, ((N,N'-bis(3-(di-t-butylaminopropyl)-t-butyl)-1,4-n-butanediamine) bis cupric(II) tetrafluoroborate,
((N,N'-bis(2-aminocyclohexyl)methyl)-1,4-n-butanediamine) bis cupric(II) tetrafluoroborate, ((N,N'-bis(2-(dimethylaminocyclohexyl)methyl)-1,4-n-butanediamine) biscupric(II) tetrafluoroborate, ((N,N'-bis(2-(diethylaminocyclohexyl)ethyl)-1,4-n-butanediamine) bis cupric(II) tetrafluoroborate, ((N,N'-bis(2-(dipropylaminocyclohexyl)propyl-1,4-n-butanediamine) biscupric(II) tetrafluoroborate, ((N,N'-bis(2-(diisopropylaminocyclohexyl)isopropyl)-1,4-n-butanediamine) biscupric(II) tetrafluoroborate, ((N,N'-bis(2-(di-n-butylaminocyclohexyl)-n-butyl)-1,4-n-butanediamine) bis cupric(II) tetrafluoroborate, ((N,N'-bis(2-(di-t-butylaminocyclohexyl)-t-butyl)-1,4-n-butanediamine) biscupric(II) tetrafluoroborate,
((N,N'-bis(2-aminoethyl)-1,5-n-pentanediamine) bis cupric(II) tetrafluoroborate, ((N,N'-bis(2-(dimethylaminoethyl)methyl)-1,5-n-pentanediamine) bis cupric(II) tetrafluoroborate, ((N,N'-bis(2-(diethylaminoethyl)ethyl)-1,5-n-pentanediamine) bis cupric(II) tetrafluoroborate, ((N,N'-bis(2-(dipropylaminoethyl)propyl)-1,5-n-pentanediamine) biscupric(II) tetrafluoroborate, ((N,N'-bis(2-(diisopropylaminoethyl)isopropyl)-1,5-n-pentanediamine) biscupric(II) tetrafluoroborate, ((N,N'-bis(2-(di-n-butylaminoethyl)-n-butyl)-1,5-n-pentanediamine) bis cupric(II) tetrafluoroborate, ((N,N'-bis(2-(di-t-butylaminoethyl)-t-butyl)-1,5-n-pentanediamine) biscupric(II) tetrafluoroborate,

TABLE 29

((N,N'-bis(3-aminopropyl)-1,5-n-pentanediamine) biscupric(II) tetrafluoroborate, ((N,N'-bis(3-(dimethylaminopropyl)methyl)-1,5-n-pentanediamine) bis cupric(II) tetrafluoroborate, ((N,N'-bis(3-(diethylaminopropyl)ethyl)-1,5-n-pentanediamine) bis cupric(II) tetrafluoroborate, ((N,N'-bis(3-(dipropylaminopropyl)propyl)-1,5-n-pentanediamine) bis cupric(II) tetrafluoroborate, ((N,N'-bis(3-(diisopropylaminopropyl)isopropyl)-1,5-n-pentanediamine) bis cupric(II) tetrafluoroborate, ((N,N'-bis(3-(di-n-butylaminopropyl)-n-butyl)-1,5-n-pentanediamine) bis cupric(II) tetrafluoroborate, ((N,N'-bis(3-(di-t-butylaminopropyl)-t-butyl)-1,5-n-pentanediamine) biscupric(II) tetrafluoroborate,
((N,N'-bis(2-aminocyclohexyl)-1,5-n-pentanediamine) bis cupric(II) tetrafluoroborate, ((N,N'-bis(2-(dimethylaminocyclohexyl)methyl)-1,5-n-pentanediamine) bis cupric(II) tetrafluoroborate, ((N,N'-bis(2-(diethylaminocyclohexyl)ethyl)-1,5-n-pentanediamine) biscupric(II) tetrafluoroborate, ((N,N'-bis(2-(dipropylaminocyclohexyl)propyl)-1,5-n-pentanediamine) bis cupric(II) tetrafluoroborate, ((N,N'-bis(2-(diisopropylaminocyclohexyl)isopropyl-1,5-n-pentanediamine) biscupric(II) tetrafluoroborate, ((N,N'-bis(2-(di-n-butylaminocyclohexyl)-n-butyl)-1,5-n-pentanediamine) bis cupric(II) tetrafluoroborate, ((N,N'-bis(2-(di-t-butylaminocyclohexyl)-t-butyl)-1,5-n-pentanediamine) bis cupric(II) tetrafluoroborate,
((N,N'-bis(3-aminoethyl)-1,6-n-hexanediamine) bis cupric(II) tetrafluoroborate, ((N,N'-bis(2-(dimethylaminoethyl)methyl)-1,6-n-hexanediamine) bis cupric(II) tetrafluoroborate, ((N,N'-bis(2-(diethylaminoethyl)ethyl)-1,6-n-hexanediamine) bis cupric(II) tetrafluoroborate, ((N,N'-bis(2-(dipropylaminoethyl)propyl)-1,6-n-hexanediamine) bis cupric(II) tetrafluoroborate, ((N,N'-bis(2-(diisopropylaminoethyl)isopropyl)-1,6-n-hexanediamine) bis cupric (II) tetrafluoroborate, ((N,N'-bis(2-(di-n-butylaminoethyl)-n-butyl)-1,6-n-hexanediamine) bis cupric(II) tetrafluoroborate, ((N,N'-bis(2-(di-t-butylaminoethyl)-t-butyl)-1,6-n-hexanediamine) bis cupric(II) tetrafluoroborate,

TABLE 30

((N,N'-bis(3-aminopropyl)-1,6-n-hexanediamine) bis cupric(II) tetrafluoroborate, ((N,N'-bis(3-dimethylaminopropyl)methyl)-1,6-n-hexanediamine) biscupric(II) tetrafluoroborate, ((N,N'-bis(3-(diethylaminopropyl)ethyl)-1,6-n-hexanediamine) biscupric(II) tetrafluoroborate, ((N,N'-bis(3-dipropylaminopropyl)propyl)-1,6-n-hexanediamine) biscupric(II) tetrafluoroborate, ((N,N'-bis(3-(diisopropylaminopropyl)isopropyl)-1,6-n-hexanediamine) bis cupric (II) tetrafluoroborate, ((N,N'-bis(3-(di-n-butylaminopropyl)-n-butyl)-1,6-n-hexanediamine) bis cupric(II) tetrafluoroborate, ((N,N'-bis(3-(di-t-butylaminopropyl)-t-butyl)-1,6-n-hexanediamine) biscupric(II) tetrafluoroborate,
((N,N'-bis(2-aminocyclohexyl)-1,6-n-hexanediamine) bis cupric(II) tetrafluoroborate, ((N,N'-bis(2-(dimethylaminocyclohexyl)methyl)-1,6-n-hexanediamine) bis cupric(II) tetrafluoroborate, ((N,N'-bis(2-(diethylaminocyclohexyl)ethyl)-1,6-n-hexanediamine) biscupric(II) tetrafluoroborate, ((N,N'-bis(2-(dipropylaminocyclohexyl)propyl)-1,6-n-hexanediamine) bis cupric(II) tetrafluoroborate, ((N,N'-bis(2-(diisopropylaminocyclohexyl)isopropyl)-1,6-n-hexanediamine) bis cupric(II) tetrafluoroborate, ((N,N'-bis(2-(di-n-butylaminocyclohexyl)-n-butyl)-1,6-n-hexanediamine) bis cupric(II) tetrafluoroborate, ((N,N'-bis(2-di-t-butylaminocyclohexyl)-t-butyl)-1,6-n-hexanediamine) bis cupric(II) tetrafluoroborate By using, for example, the above-described copper complexes, a high degree of polymerization is enabled for the oxidative polymerization of fluorophenols of the present invention.

The fluorophenol such as that represented by the above formula (II), which is involved in the method of the present invention, are phenols with at least one fluorine atom and at least one hydrogen atom bonded to the carbon atom constituting the benzene ring, wherein such benzene rings may contain substituents such as hydrocarbon groups, which may contain one or more substituents, and electron withdrawing substituents other than fluorine atom (e.g. chloro group, bromo group, iodo group, nitro group, cyano group, etc.).

Among such fluorophenols, the fluorophenols of the above formula containing a hydrogen atom at the 4-position of the benzene ring are representative examples for the present invention. Some specific examples are 2-fluorophenol, 3-fluorophenol, 2,6-difluorophenol, 2,5-difluorophenol, 2,3-difluorophenol, 3,5-difluorophenol, 2,3,5-trifluorophenol, 2,3,6-trifluorophenol, 2,3,5,6-tetrafluorophenol, etc.

The catalyst of the present invention is characteristic in that the valence change of the central metallic copper from univalent to trivalent is responsible for the catalytic activity and the ligand contributes to the regulation of the oxidation-reduction potential and the rapid formation of the oxygen cross-linking coordination. These copper complexes are not only useful as catalysts for the oxidative polymerization of fluorophenols but are also useful as catalysts for the oxidative polymerization of phenols with other electron withdrawing substituents (e.g. chloro group, bromo group, iodo group, nitro group, cyano group, etc.).

The oxidative polymerization of the present invention may preferably be carried out at a temperature from around ordinary temperature to about 70° C. under oxygen in the presence of a solvent. Examples of solvents which may preferably be used are benzene, toluene, o-xylene, m-xylene, monochlorobenzene, o-dichlorobenzene, m-dichlorobenzene, nitrobenzene, as well as halogenated hydrocarbons such as dichloromethane, 1,2-dichloropropane, 1,1,2,2-tetrachloropropane, etc. These solvents may be used alone or as a mixture of two or more of preferable solvents. Further, the reaction is accelerated by the use of base as a promoter. Examples of such base usable as promoters are sodium hydroxide, potassium hydroxide, trimethylamine, N,N'-dimethylalkylamine, N-methylpyrrolidine, 2,6-diphenylpyridine, etc.

According to the invention of the present application, a poly(oxyfluorophenylene) compound of the general formula (I), wherein $R^1$, $R^2$, $R^3$ and $R^4$ are hydrogen atoms or fluorine atoms, at least one of which is a fluorine atom, and n is an integer greater than or equal to 2, is provided. In this case, as long as n is greater than or equal to 2, the product may be an oligomer of comparatively low molecular weight with a degree of polymerization (n) less than 20, or a polymer with a degree of polymerization (n) greater than or equal to 20.

Further, the poly(oxyfluorophenylene) compounds of the present invention may be those prepared by re-polymerizing the oligomer obtained by the oxidative polymerization of fluorophenols. In this case, conditions for the re-polymerization are not particularly limited, nor are the catalysts, solvents, polymerization temperature and reaction time.

Furthermore, the present invention provides poly(oxyfluoro-1,4-phenylene-co-oxy-1,4-arylene) compounds prepared by the copolymerization of the above fluorophenols with substituted phenols. Various substituted phenols may be used, examples of which include 2-methylphenol, 3-chlorophenol, 2,5-dimethylphenol, 3,6-diphenylphenol, 2,6-dicyclohexylphenol, 2,5-dichlorophenol, 3,6-dibromophenol, 2,3,5-triethylphenol, 2,3,5,6-tetramethylphenol, etc.

Moreover, the present invention provides a method for preparing poly(oxyfluorophenylene) compounds with substituted phenyl ether groups on its side chain, by reacting the poly(oxyfluorophenylene) compound described above with a substituted phenol to replace the fluoro group with a substituted ether group, Such method of production may be exemplified by the following scheme (III):

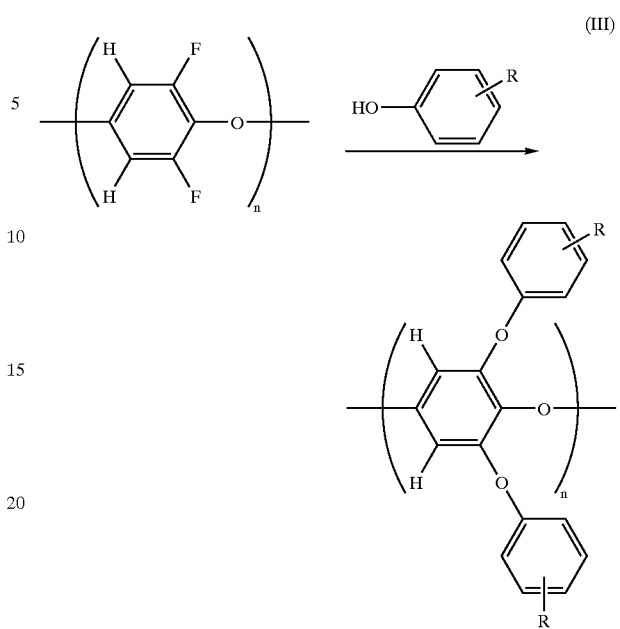

Thus in the above scheme (III), poly(oxyfluorophenylene) compound of formula (I), wherein $R^2$ and $R^4$ are fluorine, is used as a starting material and reacted with a phenol containing the substituent R.

The poly(oxyfluorophenylene) compound of the starting material is not limited to that shown in scheme (III), and may contain 1 to 4 fluorine atoms, whose positions are not limited to 2,6. Various compounds such as poly(2-monofluoro-1,4-phenylne oxide), poly(3-monofluoro-1,4-phenylene oxide), poly(2,5-difluoro-1,4-phenylene oxide) poly(3,5-difluoro-1,4-phenylene oxide), poly(2,3,5-trifluoro-1,4-phenyleneoxide), poly(2,3,6-trifluoro-1,4-phenylene oxide), poly (2,3,5,6-tetrafluoro-1,4-phenylene oxide), etc. may be used as the starting material.

Further, the substituted phenol to be reacted may contain the substituent (R) at the ortho, meta or para positions, and may contain the same or different substituents at any two or more positions among the 2- to 6- positions in relation to the OH group, such as 2,4-, 2,5-, 3,5- etc. The substituent R may be chosen from various substituents such as substituents containing halogen atom, O, S or N, alkyl groups and substituted alkyl groups. Examples of such substituted phenols are p-phenolsulfonic acid, o-nitrophenol, m-chlorophenol, etc.

Of course, in the present method for producing poly(oxyphenylene) compounds with substituted phenyl ether group in its side chain, the poly(oxyfluorophenylene) compounds and the substituted phenol used as the starting material are not limited to those exemplified above, and phenyl ether groups containing various substituents may be introduced thereto. By introducing such various phenyl ether groups, the mechanical and physical properties of the poly(oxyphenylene) compounds obtained may be controlled.

In scheme (III), the phenyl other is, in other words, introduced into the compound by the substitution of the fluorine atom of the starting poly(oxyfluorophenylene) compounds (chemical formula (I)) with a substituted phenol. Conditions of such reactions are not limited in particular, whereby catalysts, solvents, reaction temperatures and reaction time may be selected depending upon the substituted phenol to be introduced or the poly(oxyfluorophenylene) compound used as the starting material.

Examples are shown bellow to further illustrate the present invention in detail. It is needless to say, that the scope of the present invention is not to be limited by the following examples.

EXAMPLES

Example 1

0.26 g of 2,6-difluorophenol and 0.23 g of 2,6-diphenylpyridine were dissolved in 4 ml of monochlorobenzene, followed by the addition of 0.04 g of ((1,4,7-triisopropyl-1,4,7-triazacyclononane) cupric (II)) bromide, and the mixture was stirred at 40° C. for 48 hours with oxygen ventilation. The reaction mixture was added dropwise into methanol acidified with hydrochloric acid to give white precipitate. The precipitate was filtered to separate the unreacted materials and catalyst, washed with methanol and dried in vacuo to give 0.22 g of white powder.

The production of poly(2,6-difluoro-1,4-arylene)ether was confirmed by the presence of ether bonding 1107 cm−1 ($\nu_{c-o-c}$) and 1,4-phenylene structure 844 cm$^{-1}$ (($\delta_{c-H}$) in the IR Spectrum, 1H-NMR (d, 6.90 ppm), 13C-NMR (101.5, 127.0, 156.6, 158.0 ppm) and 19F-NMR (−121.2 ppm).

Yield 85%, Mn=4500, Mw=8500, Td10%=460° C.

Example 2

0.26 g of 2,6-difluorophenol and 0.23 g of 2,6-diphenylpyridine were dissolved in 4 ml of monochlorobenzene, followed by the addition of 0.04 g of ((1,4,7-triisopropyl-1,4,7-triazacyclononane)cupric (II)) bromide. The mixture was stirred at 40° C. for 96 hours with oxygen ventilation. The reaction mixture was added dropwise into methanol acidified with hydrochloric acid to give poly(2,6-difluoro-1,4-arylene) ether.

IR (1107 cm−1: ν c-o-c, 844 cm−1: δ c-H), 1H-NMR (d, 6.90 ppm), 13C-NMR (101.5, 127.0, 156.6, 158.0 ppm), 19F-NMR (−121.2 ppm)

Yield 90%, Mn=4200, Mw=6800.

Example 3

0.26 g of 2,6-difluorophenol and 0.23 g of 2,6-diphenylpyridine was dissolved in 4 ml of o-dichlorobenzene, followed by the addition of 0.04 g of ((1,4,7-triisopropyl-1,4,7-triazacyclononane) cupric (II)) bromide. The mixture was stirred at 40° C. for 96 hours with oxygen ventilation. The reaction mixture was added dropwise into methanol acidified with hydrochloric acid to give poly(2,6-difluoro-1,4-arylene) ether.

IR (1107 cm−1: ν c-o-c, 844 cm−1: δ c-H), 1H-NMR (d, 6.90 ppm), 13C-NMR (101.5, 127.0, 156.6, 158.0 ppm), 19F-NMR (−121.2 ppm)

Yield 84%, Mn=5100, MW=9300.

Example 4

0.26 g of 2,6-difluorophenol and 0.23 g of 2,6-diphenylpyridine was dissolved in 4 ml of monochlorobenzene, followed by the addition of 0.04 g of ((1,4,7-triisopropyl-1,4,7-triazacyclononane) cupric (II)) bromide. The mixture was stirred at 60° C. for 24 hours with oxygen ventilation. The reaction mixture was added dropwise into methanol acidified with hydrochloric acid to give poly(2,6-difluoro-1,4-arylene) ether.

IR (1107 cm−1: ν c-o-c, 844 cm−1: δ c-H), 1H-NMR (d, 6.90 ppm), 13C-NMR (101.5, 127.0, 156.6, 158.0 ppm), 19F-NMR (−121.2 ppm)

Yield 88%, Mn=4100, Mw=7600.

Example 5

To a solution of 0.26 g of 2,6-difluorophenol and 0.23 g of 2,6-diphenylpyridine in 4 ml of o-dichlorobenzene, was added 0.04 g of ((1,4,7-triisopropyl-1,4,7-triazacyclononane) cupric (II)) bromide, which was then stirred at 60° C. for 24 hours with oxygen ventilation. The reaction mixture was added dropwise into methanol acidified with hydrochloric acid to give poly(2,6-difluoro-1,4-arylene)ether.

IR (1107 cm−1: ν c-o-c, 844 cm−1: δ c-H), 1H-NMR (d, 6.90 ppm), 13C-NMR (101.5, 127.0, 156.6, 158.0 ppm), 19F-NMR (−121.2 ppm)

Yield 84%, Mn=4100, Mw=7500.

Examples 6–13

In the following Examples 6–13, the poly(oxyfluorophenylene) compounds were prepared according to the following scheme (IV):

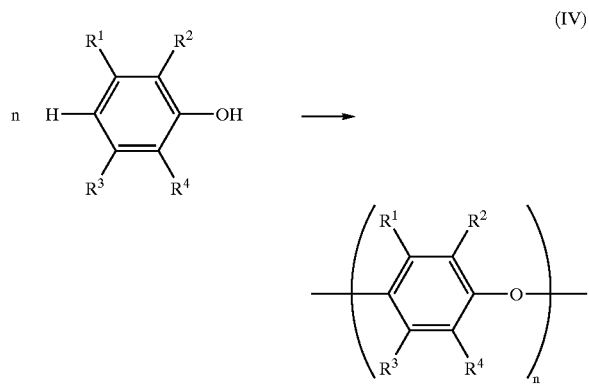

Example 6

In a glass vessel with a volume of 10 ml, 0.26 g of 2,6-difluorophenol and 0.23 g of 2,6-diphenylpyridine were dissolved in 4 ml of monochlorobenzene, after which 0.04 g of ((1,4,7-triisopropyl-1,4,7triazacyclononane) cupric (II)) bromide were added as a polymerization catalyst. The mixture was stirred at 40° C. for 48 hours while ventilating with oxygen.

The reaction mixture was added dropwise into methanol acidified with hydrochloric acid to give white precipitate. The precipitate was filtered to separate the unreacted materials and catalyst, washed with methanol and dried in vacuo to give 0.22 g of white powder.

The result of identification is shown in Table 31.

The production of poly(2,6-difluoro-1,4-arylene)ether with a degree of polymerization (n)=35 was confirmed by Table 31.

TABLE 31

| IR spectre: | 1107 cm$^{-1}$ ($\nu_{c-o-c}$), 844 cm$^{-1}$ ($\delta_{c-H}$) |
|---|---|
| $^1$H-NMR | (d, 6.90 ppm) |
| $^{13}$C-NMR | (101.5, 127.0, 156.6, 158.0 ppm) |

TABLE 31-continued

| | | |
|---|---|---|
| $^{19}$F-NMR | (−121.2 ppm) | |
| Yield | 85% | |
| Mn = 4500, Mw = 8500, n = 35, Td 10% = 460° C. | | |

Example 7

To a solution of 0.26 g of 2,6-difluorophenol and 0.23 g of 2,6-diphenylpyridine in 4 ml of monochlorobenzene 0.04 g of ((1,4,7triisopropyl-1,4,7-triazacyclononane) cupric (II)) bromide was added, and stirred at 40° C. for 96 hours while ventilating with oxygen.

The reaction mixture was added dropwise into methanol acidified with hydrochloric acid to give the product. The result of identification is shown in Table 32.

Production of poly(2,6-difluoro-1,4-arylene)ether with the polymerization degree (n)=33 was confirmed from Table 32.

TABLE 32

| | |
|---|---|
| IR spectre: | 1109 cm$^{-1}$ ($v_{c-o-c}$), 845 cm$^{-1}$ ($\delta_{c-H}$) |
| $^1$H-NMR | (d, 6.91 ppm) |
| $^{13}$C-NMR | (101.3, 127.2, 156.5, 158.1 ppm) |
| $^{19}$F-NMR | (−121.1 ppm) |
| Yield | 90% |
| Mn = 4200, Mw = 6800, n = 33 | |

Example 8

To a solution of 0.26 g of 2,6-difluorophenol and 0.23 g of 2,6-diphenylpyridine in 4 ml of o-dichlorobenzene was added 0.04 g of ((1,4,7-triisopropyl-1,4,7-triazacyclononane) cupric (II)) bromide, which was stirred at 40° C. for 96 hours while ventilating with oxygen.

The reaction mixture was added dropwise into methanol acidified with hydrochloric acid to give a product. Table 33 shows the result of identification.

Production of poly(2,6-difluoro-1,4-arylene) ether with the polymerization degree (n)=40 was confirmed from Table 33.

TABLE 33

| | |
|---|---|
| IR spectre: | 1108 cm$^{-1}$ ($v_{c-o-c}$), 844 cm$^{-1}$ ($\delta_{c-H}$) |
| $^1$H-NMR | (d, 6.90 ppm) |
| $^{13}$C-NMR | (101.5, 127.1, 156.6, 158.1 ppm) |
| $^{19}$F-NMR | (−121.0 ppm) |
| Yield | 84% |
| Mn = 5100, Mw = 9300, n = 40 | |

Example 9

To a solution of 0.26 g of 2,6-difluorophenol and 0.23 g of 2,6-diphenylpyridine in 4 ml of monochlorobenzene was added 0.04 g of ((1,4,7-triisopropyl-1,4,7-triazacyclononane) cupric (II)) bromide, and the mixture was stirred at 60° C. for 24 hours while ventilating with oxygen.

The reaction mixture was added dropwise into methanol acidified with hydrochloric acid to give the product. Table 34 shows the result of identification.

Production of poly(2,6-difluoro-1,4-arylene)ether showing the polymerization degree (n)=32 was confirmed from the results of Table 34.

TABLE 34

| | |
|---|---|
| IR spectre: | 1108 cm$^{-1}$ ($v_{c-o-c}$), 845 cm$^{-1}$ ($\delta_{c-H}$) |
| $^1$H-NMR | (d, 6.92 ppm) |
| $^{13}$C-NMR | (101.6, 127.1, 156.6, 158.0 ppm) |
| $^{19}$F-NMR | (−121.0 ppm) |
| Yield | 88% |
| Mn = 4100, Mw = 7500, n = 32 | |

Example 10

To a solution of 0.26 g of 2,6-difluorophenol and 0.23 g of 2,6-diphenylpyridine in 4 ml of o-dichlorobenzene 0.04 g of ((1,4,7-triisopropyl-1,4,7-triazacyclononane) cupric (II)) bromide was added, which was then stirred at 60° C. for 24 hours with oxygen ventilation.

The reaction mixture was added dropwise into methanol acidified with hydrochloric acid to give the product. Table 35 shows the result of identification.

Production of poly(2,6-difluoro-1,4-arylene) ether with the polymerization degree (n)=32 was confirmed from Table 35.

TABLE 35

| | |
|---|---|
| IR spectre: | 1107 cm$^{-1}$ ($v_{c-o-c}$), 844 cm$^{-1}$ ($\delta_{c-H}$) |
| $^1$H-NMR | (d, 6.90 ppm) |
| $^{13}$C-NMR | (101.5, 127.0, 156.8, 158.0 ppm) |
| $^{19}$F-NMR | (−121.2 ppm) |
| Yield | 84% |
| Mn = 4100, Mw = 7500, n = 32 | |

Example 11

To a solution of 0.26 g of 2,6-difluorophenol and 0.23 g of 2,6-diphenylpyridine in 4 ml of o-dichlorobenzene was added 0.027 g of (N,N"-bis(2-methylaminoethylmethyl)-1, 5-n-pentanediamine) cupric (II)) bromide, which was then stirred at 40° C. for 72 hours while oxygen ventilation.

The reaction mixture was added dropwise into methanol acidified with hydrochloric acid to give the product. Table 36 shows the result of identification.

Production of poly(2,6-difluoro-1,4-arylene)ether showing a polymerization degree (n)=22 was confirmed from the result8 of Table 36.

TABLE 36

| | |
|---|---|
| IR spectre: | 1108 cm$^{-1}$ ($v_{c-o-c}$), 844 cm$^{-1}$ ($\delta_{c-H}$) |
| $^1$H-NMR | (d, 6.93 ppm) |
| $^{13}$C-NMR | (101.5, 127.2, 156.6, 158.2 ppm) |
| $^{19}$F-NMR | (−121.1 ppm) |
| Yield | 75% |
| Mn = 2800, Mw = 5900, n = 22 | |

Example 12

To a solution of 0.26 g of 2,3,5,6-tetrafluorophenol and 0.23 g of 2,6-diphenylpyridine in 4 ml of monochlorobenzene, 0.04 g of ((1,4,7-triisopropyl-1,4,7-triazacyclononane) cupric (II)) bromide was added, which was then was stirred at 40° C. for 96 hours with oxygen ventilation.

The reaction mixture was added dropwise into methanol acidified with hydrochloric acid to give the product. Table 37 shows the result of identification. Production of poly(2, 3,5,6-tetrafluoro-1,4-arylene) ether with the polymerization degree (n)=21, was confirmed from Table 37.

TABLE 37

| IR spectre: | 1109 cm$^{-1}$ ($v_{c-o-c}$), 845 cm$^{-1}$ ($\delta_{c-H}$) |
|---|---|
| Yield | 22% |
| Mn = 3500, Mw = 6200, n = 21 | |

Example 13

To a solution of 0.26 g of 2,3,5,6-tetrafluorophenol, 0.3 g of 2,6-dimethylphenol and 0.23 g of 2,6-diphenylpyridine in 4 ml of monochlorobenzene was added 0.04 g of ((1,4,7-triisopropyl-1,4,7-triazacyclononane) cupric (II)) bromide. The mixture was then stirred t 40° C. for 96 hours while ventilating with oxygen.

The reaction mixture was added dropwise into methanol acidified with hydrochloric acid to give the product. The result of identification is shown in Table 38.

The production of poly(oxy-2,3,5,6-tetrafluoro-1,4-phenylene-cooxy-2,6-dimethyl-1,4-phenylene) with the polymerization degree (n)=33 was confirmed from Table 38.

TABLE 38

| IR spectre: | 3090 cm$^{-1}$ ($v_{c-o-c}$), 1109 cm$^{-1}$ ($v_{c-o-c}$), 845 cm$^{-1}$ ($\delta_{c-H}$) |
|---|---|
| Yield | 46% |
| Mn = 5400, Mw = 8900, n = 33 | |

Example 14

According to the following reaction scheme (V), sulfonic acid groups were introduced into poly(2,6-difluoro-1,4-phenylene oxide).

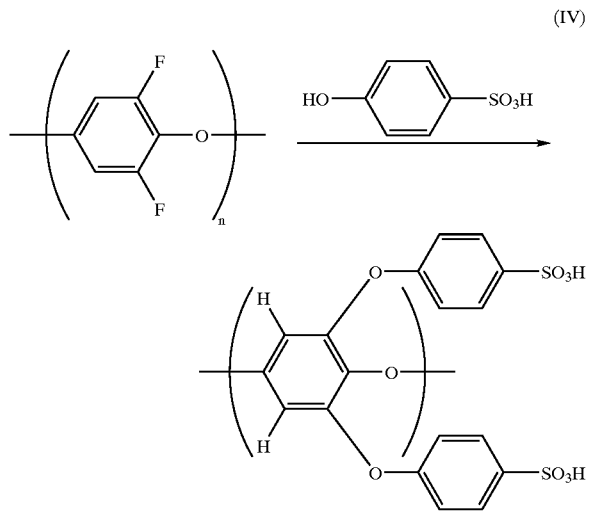

0.260 g (0.002 mol) of poly(2,6-difluoro-1,4-phenylene oxide) and 7.68 g (0.04 mol) of p-phenolsulfonic acid were added to a glass vessel, into which 10 ml of dimethylacetamide was added as a solvent. Then, 5.54 g (0.04mol) of anhydrous potassium carbonate and 0.4 g (0.002 mol) of cupric iodide were added to the mixture, which was heated at 160° C. for 48 hours in a nitrogen atmosphere.

The reaction mixture was dissolved in 300 ml of methanol. The soluble part was filtered, recovered and the filtrate was evaporated to dryness. The residual solid was dissolved in 50 ml of water, and then dialyzed in 3 L of pure water through a dialyzing membrane to remove the low molecular weight ingredient (1 hour later). The solution after dialysis was evaporated to dryness, whereby a brown solid was obtained an the product.

INDUSTRIAL APPLICABILITY

As explained above in detail, in the present invention, the reaction proceeds under very mild conditions with ordinary temperature and ordinary pressure, using dissolved oxygen as an oxidizing agent. The catalyst for oxidative polymerization according to the present invention may be used not only for the polymerization of fluorophenols, but also of phenols with other electron withdrawing substituents (e.g. chloro group, bromo group, iodo group, nitro group, cyano group, etc.). Further, because the catalyst shows high selectivity of the 4-electron reduction of oxygen, it may be useful as an oxygen reducing electrode catalyst by fixing the catalyst on the surface of an electrode through various means.

Furthermore, according to the present invention, the poly (oxyfluorophenylene) compounds whose polymerization has been considered difficult so far, may be prepared under mild conditions and thus provided. Further, the present invention provides not only homopolymers but also copolymers thereof with various substituted phenols. Furthermore, the invention provides a method for introducing a substituted phenyl ether group into poly(oxyfluorophenylene) compounds. Therefore, controlling the physical properties of poly(oxyfluorophenylene) compounds, according to its usage becomes possible.

What is claimed is:

1. A method for the oxidative polymerization of fluorophenols, which comprises reacting a fluorophenol represented by the following formula (II):

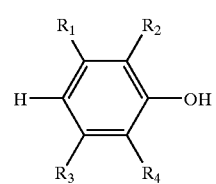

(wherein $R^1$, $R^2$, $R^3$ and $R^4$ each represent a hydrogen atom, a hydrocarbon group or a fluorine atom, at least one of $R^1$, $R^2$, $R^3$ and $R^4$ being a fluorine atom) in the presence of a copper complex catalyst selected from the group consisting of mononuclear copper complexes containing aliphatic cyclic amine-type multidentate ligands; mononuclear copper complexes containing alkylenediamine ligands; and binuclear copper complexes containing aliphatic cyclic amine-type mutltidentate ligands or alkylenediamine ligands bonded by an alkyl chain.

2. The method for the oxidative polymerization of fluorophenols of claim 1, wherein the copper complex catalyst is a complex selected from the group consisting of
((bis(1,4,7-triazacycloalkyl)alkane)-biscupric(II)) halide-type complexes;
((bis(1,4,7-triazacycloalkyl)alkane)-biscupric(II)) perchlorate-type complexes;
((bis(1,4,7-triazacycloalkyl)alkane)-biscupric(II)) trifluoromethanesulfonate-type complexes;
((bis(1,4,7-triazacycloalkyl)alkane)-biscupric(II)) hexafluorophosphate-type complexes;

((bis(1,4,7-triazacycloalkyl)alkane)-biscupric(II)) tetrafluoroborate-type complexes;

propanediamine cupric (II)-type complexes, cyclohexanediamine cupric (II)-type complexes;

((N,N'-bis(aminoalkyl)-alkylenediamine)biscupric(II)) chloride-type complexes;

((N,N'-bis(aminoalkyl)-alkylenediamine)biscupric(II)) bromide-type complexes, ((N,N'-bis(aminoalkyl)-alkylenediamine)biscupric(II)) perchlorate-type complexes;

((N,N'-bis(aminoalkyl)-alkylenediamine)biscupric(II)) trifluoromethanesulfonate-type complexes;

((N,N'-bis(aminoalkyl)-alkylenediamine)biscupric(II)) hexafluorophosphate-type complexes; and ((N,N'-bis(aminoalkyl)-alkylenediamine)biscupric(II)) tetrafluoroborate-type complexes.

3. The method for the oxidative polymerization of fluorophenols of claim 1, wherein the copper complex catalyst is a complex selected from the group consisting of ((1,4,7-triisopropyl-1,4,7-triazacyclononane) cupric(II)) bromide;

((1,4,7-triisopropyl-1,4,7-triazacyclononane) cupric(II)) chloride; and ((N,N'-bis(2-methylaminoethylmethyl)-1,5-n-pentane diamine) cupric(II))bromide.

4. A poly(oxyfluoro-1,4-phenylene-co-oxy-1,4-arylene) compound obtained by the oxidative polymerization of the fluorophenol of the following formula (II):

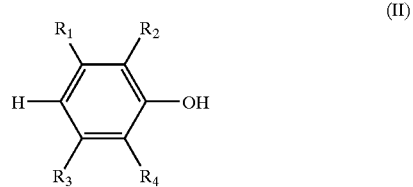

(II)

(wherein $R^1$, $R^2$, $R^3$ and $R^4$ each is a hydrogen atom or a fluorine atom, at least one of which is a fluorine atom) with a substituted phenol.

5. A method for producing poly(oxyfluoro-1,4-phenylene-co-oxy-1,4-arylene), comprising the oxidative polymerization of the fluorophenol of the following formula (II):

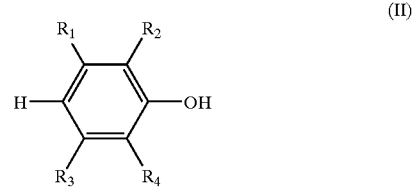

(II)

(wherein $R^1$, $R^2$, $R^3$ and $R^4$ each is a hydrogen atom or a fluorine atom, at least one of which is a fluorine atom) with a substituted phenol in the presence of a copper complex catalyst selected from the group consisting of mononuclear copper complexes containing aliphatic cyclic amine-type multidentate ligands; mononuclear copper complexes containing alkylenediamine ligands; and binuclear copper complex containing aliphatic cyclic amine-type multidentate ligands or alkylenediamine ligands bonded by an alkyl chain.

6. A method for producing poly(oxyfluorophenylene) compounds, which comprises reacting a poly(oxyfluorophenylene) compound with a substituted phenol, thereby replacing the fluorine group with a substituted phenyl ether group.

* * * * *